US012768708B2

(12) United States Patent
Schewalje et al.

(10) Patent No.: US 12,768,708 B2
(45) Date of Patent: Oct. 20, 2026

(54) METHOD FOR ANALYSING THE STATE OF A PUMP ASSEMBLY AND SOFTWARE APPLICATION, STORAGE MEDIUM AND ANALYSIS DEVICE FOR EXECUTION OF THE METHOD

(71) Applicant: WILO SE, Dortmund (DE)

(72) Inventors: Alex Schewalje, Dortmund (DE); Andreas Toews, Dortmund (DE); Goekhan Sen, Dortmund (DE); Klaus Edmund Raebiger, Dortmund (DE)

(73) Assignee: WILO SE, Dortmund (DE)

( * ) Notice: Subject to any disclaimer, the term of this patent is extended or adjusted under 35 U.S.C. 154(b) by 355 days.

(21) Appl. No.: 18/374,748

(22) Filed: Sep. 29, 2023

(65) Prior Publication Data

US 2024/0141904 A1 May 2, 2024

(30) Foreign Application Priority Data

Oct. 24, 2022 (EP) .................................... 22203357

(51) Int. Cl.
*G01H 3/08* (2006.01)
*G01H 17/00* (2006.01)
(Continued)

(52) U.S. Cl.
CPC ............... *G01H 3/08* (2013.01); *G01H 17/00* (2013.01); *G01M 13/028* (2013.01);
(Continued)

(58) Field of Classification Search
CPC ... F04D 15/0088; F04D 15/0094; G01H 3/08; G01H 3/10; G01H 17/00; G01M 13/028;
(Continued)

(56) References Cited

U.S. PATENT DOCUMENTS 4,791,045 A * 12/1988 Mitra ...................... G03F 7/029 430/920
7,860,663 B2 * 12/2010 Miyasaka ............. F16C 19/527 73/659
(Continued)

FOREIGN PATENT DOCUMENTS

DE 197 49 372 A1 5/1999
DE 102009022107 A1 * 11/2010 ......... F04D 15/0094
(Continued)

*Primary Examiner* — Peter J Macchiarolo
*Assistant Examiner* — Monica S Young
(74) *Attorney, Agent, or Firm* — Norris McLaughlin, P.A.

(57) ABSTRACT

A method, analysis device and software for analysing the state of at least one component of a pump assembly notably to determine the rotational speed of the pump assembly or with regard to an error through analysis of the airborne sound emitted by the pump assembly includes the recording of at least a first audio signal during operation of the pump assembly at a first geometric location ($P_{far}$) and at a first distance ($D_{far}$) from the pump assembly and the recording of a second audio signal during operation of the pump assembly at a second geometric location ($P_{near}$) and at a second distance ($D_{near}$) from the pump assembly which is less than the first distance ($D_{far}$).

19 Claims, 8 Drawing Sheets

Figures 1, 2, 3:
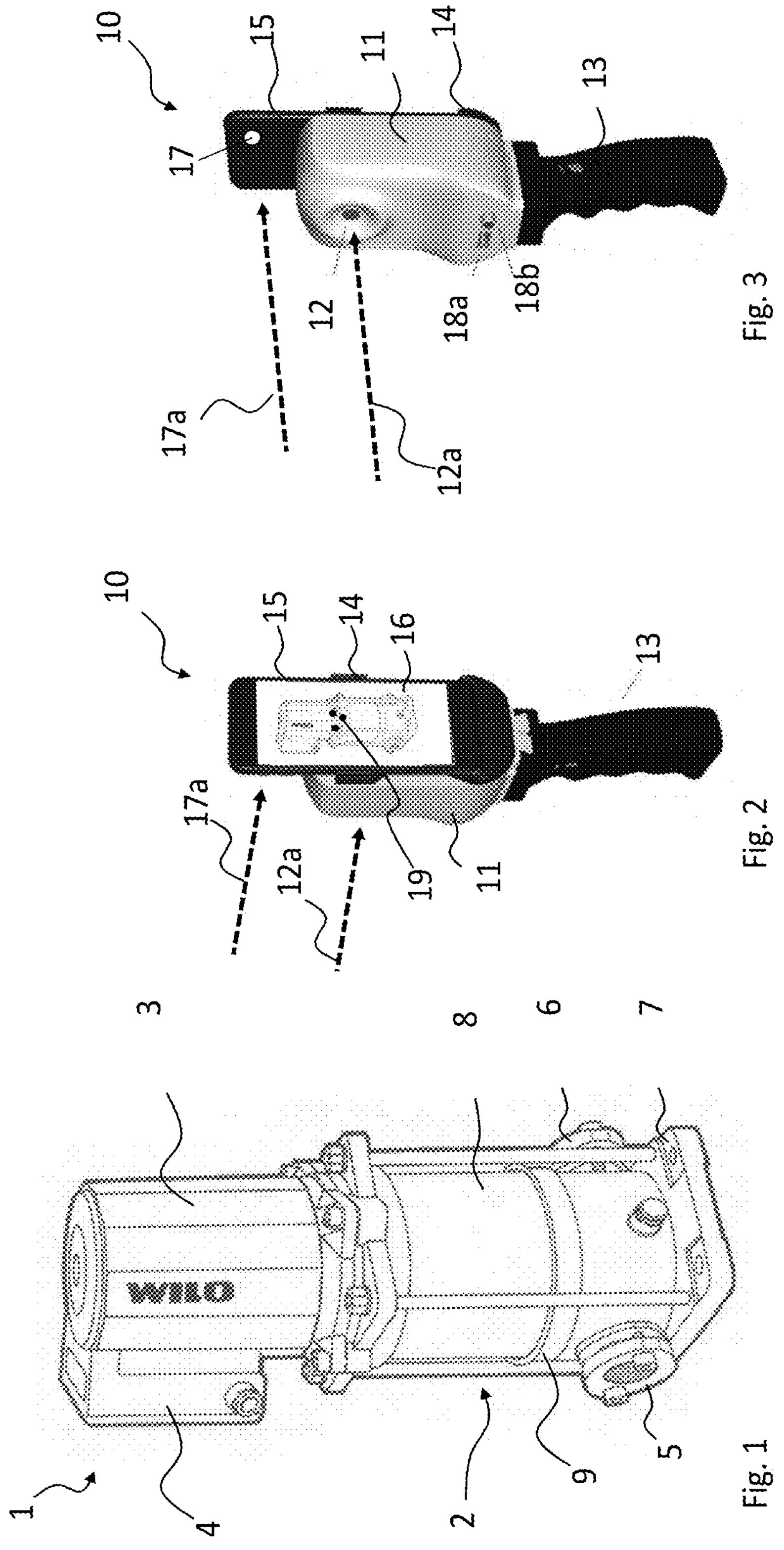

(51) Int. Cl.

| | |
|---|---|
| ***G01M 13/028*** | (2019.01) |
| ***G01M 99/00*** | (2011.01) |
| ***G10L 25/18*** | (2013.01) |
| ***G10L 25/21*** | (2013.01) |
| ***G10L 25/51*** | (2013.01) |

(52) U.S. Cl.
CPC ............. *G01M 99/00* (2013.01); *G10L 25/18* (2013.01); *G10L 25/21* (2013.01); *G10L 25/51* (2013.01)

(58) Field of Classification Search
CPC ........ G01M 99/00; G10L 25/18; G10L 25/51; G10L 25/21
USPC ............................................................. 73/593
See application file for complete search history.

(56) References Cited

U.S. PATENT DOCUMENTS

| | | | | |
|---|---|---|---|---|
| 8,028,583 | B2 | 10/2011 | Attia et al. | |
| 8,401,806 | B2 | 3/2013 | Borsting et al. | |
| 8,763,464 | B2 | 7/2014 | Emde et al. | |
| 10,187,567 | B2 | 1/2019 | Giger | |
| 10,316,849 | B2 | 6/2019 | Munk et al. | |
| 10,489,033 | B2 | 11/2019 | Migos et al. | |
| 10,949,979 | B2 | 3/2021 | Helbo Nygaard | |
| 2011/0025845 | A1 | 2/2011 | Han et al. | |
| 2017/0241422 | A1* | 8/2017 | Munk | F04D 29/669 |
| 2018/0189962 | A1* | 7/2018 | Helbo Nygaard | F04D 27/001 |
| 2019/0214416 | A1* | 7/2019 | Irie | H04N 23/672 |
| 2019/0264667 | A1* | 8/2019 | Byrne | F04B 9/02 |
| 2019/0332958 | A1* | 10/2019 | Subhankar | G01N 29/4454 |
| 2019/0339162 | A1* | 11/2019 | Munk | G01N 29/036 |
| 2019/0340799 | A1* | 11/2019 | Dryer | G06F 3/011 |
| 2021/0157292 | A1* | 5/2021 | Larsen | F04D 15/0281 |
| 2021/0254962 | A1 | 8/2021 | Dryer et al. | |
| 2022/0010671 | A1* | 1/2022 | Hunkeler | E21B 47/095 |
| 2024/0141904 | A1* | 5/2024 | Schewalje | G01H 3/10 |

FOREIGN PATENT DOCUMENTS

| | | | | |
|---|---|---|---|---|
| DE | 102014205640 | A1* | 10/2015 | G01C 3/10 |
| DE | 10 2020 005 050 | A1 | 2/2022 | |
| EP | 0 309 829 | A1 | 4/1989 | |
| EP | 0 326 249 | A2 | 8/1989 | |
| EP | 1 972 793 | A1 | 9/2008 | |
| EP | 2 669 707 | A1 | 12/2013 | |
| EP | 3 242 036 | A1 | 11/2017 | |
| EP | 3 563 062 | B1 | 7/2021 | |
| WO | 2007/023021 | A2 | 3/2007 | |
| WO | 2015/144775 | A1 | 10/2015 | |
| WO | 2015/197141 | A1 | 12/2015 | |
| WO | 2016/059112 | A1 | 4/2016 | |

* cited by examiner

METHOD FOR ANALYSING THE STATE OF A PUMP ASSEMBLY AND SOFTWARE APPLICATION, STORAGE MEDIUM AND ANALYSIS DEVICE FOR EXECUTION OF THE METHOD

The invention relates to a method for analysing the state of at least one component of a pump assembly, notably to determine the rotational speed of the pump assembly or with regard to an error through analysis of the airborne sound emitted by the pump assembly, comprising the recording of a first audio signal during operation of the pump assembly at a first geometric location and at a first distance from the pump assembly, and the recording of a second audio signal during operation of the pump assembly at a second geometric location and at a second distance from the pump assembly, which is less than the first distance.

The spectral analysis of the sounds emitted by pump assemblies during normal operation or in case of an error state is commonly known. For example, the German patent application DE102009022107 A1 proposes, among other things, measuring the airborne sound and using this to determine the rotational sound frequency through signal analysis, such as frequency analysis, for example, using a Fast Fourier Transform (FFT) or an autocorrelation, which is then used to determine the drive speed.

The exact distance between the sound source and the microphone has to be known for acoustic measurements since the sound level is dependent on distance and location. Only then can absolute sound levels (in decibels) that are detected be compared with each other.

A distance of 1 m is generally recommended for acoustic measurements. Sound levels of objects at different distances can be calculated analytically on this basis.

Generally available physical measuring equipment that is different from the acoustic measuring equipment, such as a folding rule, measuring tape or laser distance meter, is used to measure the exact distance. While the acoustic measuring equipment comprising the microphone is mounted on a stand, the distance is measured manually, where applicable using two hands, and adjusted accordingly. It goes without saying that this method is complicated, time-consuming and error-prone.

For the error analysis of a pump assembly, characteristic vibration frequencies in its spectrum are examined. However, acoustic analysis is controversial among experts. Mounting vibration sensors on the pump assembly and analysing their sensor signals is preferred, for example, in EP 1972793 A1 or EP 3 563 062 B1.

The international application WO 2015/197141 A1 on the other hand says that mounting a vibration sensor is disadvantageous and complex. As an alternative, it suggests the measurement of a sound signal emitted by the pump assembly, measured using a microphone in or on a hand-held communication device, which is then processed to identify a sound-specific state or error. Identification is realised in this case through comparison with reference values stored for the concrete pump assembly, in which a model has to be loaded in the analysis software at the start of the analysis procedure. WO 2015/197141 A1 proposes showing the positions for the placement of the hand-held unit or microphone to the user on a display. The user is also required to move the hand-held unit relative to the pump assembly, i.e. to move it closer or farther away, to the right, left, up or down while the analysis software analyses the acoustic signal it receives in real time with regard to the signal quality and amplitude, and provides feedback to the user when an optimal position is reached. Positioning takes anywhere from 10 seconds up to a minute and the distance is between 5 cm and a metre. Once the analysis software indicates that the distance is appropriate, the actual sound measurement is taken in a second step.

Nothing ensures that the distance identified as appropriate is identical to the expected distance previously shown on the display. This is a disadvantage. The described method also reaches its limits when the pump is very loud due to an error. This results in an incorrect distance being suggested to the user for the audio recording. Possible errors of the pump assembly may not be identified as a result.

Furthermore, there is no way to ensure that a position previously identified as appropriate is maintained during the measurement. A different distance may therefore be used unintentionally during the subsequent measurement, notably when the user holds the hand-held unit in their hand—especially since it was previously moved back and forth. Finally, the actual distance between the hand-held unit/microphone and the pump assembly is not considered further in the analysis nor stored in WO 2015/197141 A1.

The method according to WO 2015/197141 A1 is described as problematic in EP 3563062 B1 because the acoustic signals have to be recorded in the same way so the data can be processed and so that usable results are obtained. However, it is not possible to influence the position of the hand-held unit and the ambient noise with sufficient accuracy in practice in order to use the method for the identification of motor bearing defects as well as cavitation. Even if the user attempts to take several independent measurements, it would be very difficult or even impossible to identify motor bearing defects and cavitation. Therefore, EP 3563062 B1 again proposes the use of a vibration sensor.

WO 2016/059112 A also describes a method for the acoustic determination of the state of a pump assembly, for example, with a heat circulation pump. A conventional smartphone can be used as the recording device. It performs signal processing on the data and analyses them for the occurrence of anomalies or errors. Bearing damage or cavitation inside the pump, for example, can be identified in this manner. The advantage of this acoustic error analysis during operation of the pump assembly is that a service technician can examine the pump assembly for errors during operation without special sensors or an elaborate analysis setup. However, EP 3242036 A1 calls this method disadvantageous because it cannot be executed in noisy environments, at least not with the necessary reliability. EP 3242036 A1 therefore proposes an entirely different method, namely video analysis that determines the speeds of changes between pixels and pixel groups in sequential images of a video sequence, and determines the condition of the pump assembly based on the speeds of the changes that are identified.

Determining the state and/or a possible error of a pump assembly by analysing the airborne sound emitted by the pump assembly with sufficient accuracy, when ambient noise is present on the one hand and inaccurate positioning of the microphone relative to the pump assembly is possible on the other hand, is therefore an unsolved problem.

The object of the present invention is thus to provide a method that overcomes the aforementioned disadvantages and delivers a correct result in the analysis of the airborne sound emitted by the pump assembly, with regard to a possible error in the pump assembly, notwithstanding existing noise from a secondary sound source. Furthermore, the object of the invention is to provide a software application, a machine-readable storage medium and a mobile analysis device to execute the method. In addition, the invention shall facilitate positioning the analysis device relative to the pump assembly and make the analysis result immune to deviations of the actual measuring position from a specified measuring position, notably independent from a specification of a measuring position so that this is made obsolete.

These problems are solved by the method according to claim 1, the software application according to claim 18, the storage medium according to claim 19 and the analysis device according to claim 20. Advantageous embodiments are described in the dependent claims and explained below.

According to the present invention, a method is proposed for analysing the state of at least one component of a pump assembly, notably to determine the rotational speed of the pump assembly or with regard to an error through analysis of the airborne sound emitted by the pump assembly, comprising the recording of at least a first audio signal during operation of the pump assembly at a first geometric location and at a first distance from the pump assembly, and the recording of a second audio signal during operation of the pump assembly at a second geometric location and at a second distance from the pump assembly, which is less than the first distance, in which the state of the pump assembly is determined through the analysis of a signal of the pump assembly corrected for the ambient noise of at least one secondary sound source, which is reconstructed through a comparison of amplitude values of the first and second audio signals.

In terms of the present invention, a pump assembly means an arrangement of a pump unit that conveys a liquid, notably a centrifugal pump assembly, and a drive unit driving the same, for example, an electric motor. Pump electronics to control and/or regulate the electric motor may be present as well. Alternatively, only a terminal box with electrical connections of the electric motor may be present. The aforementioned components may form a structural unit or merely interact functionally, and therefore be arranged separately. Thus the electric motor may drive the pump assembly directly or via a coupling or gear mechanism. In case of a direct drive, the motor shaft may also be the pump shaft and carry at least one impeller. The pump unit may have one or more stages, i.e. one or more impellers. The pump assembly may be a dry rotor pump or a wet rotor pump. The pump electronics may be mounted on the casing of the electric motor or arranged separately.

Insofar as reference is made to a state in terms of the present invention, this means the operating state of a component of the pump assembly or the entire pump assembly in general, i.e. whether the pump assembly or the examined component is operating within normal parameters from an acoustic perspective, or differently put, without a specific acoustic abnormality, or whether such an acoustic abnormality exists, indicating an error. In particular, the operating state can also refer to the current rotational speed at which the pump assembly is operating at the moment.

An error means a faulty operating state of the pump assembly or one of its components that, from an acoustic perspective, results in at least one abnormality in the airborne sound emitted by the pump assembly. Examples of such an error include bearing damage, more precisely damage to a roller bearing or slide bearing, or cavitation, a damaged impeller, damage to a mechanical seal, plugging, an out-of-balance rotating part or one or more loose screws. All of these technical errors cause certain vibrations of the pump assembly or at least one of its components, which can also be detected in the airborne sound.

The acoustic abnormalities and/or the rotational speed can be identified, using known means, from the frequency spectrum of the airborne sound emitted by the pump assembly, due to the presence of certain frequencies and/or peaks, and the rotational speed can be estimated.

Thus a reconstructed frequency spectrum can serve as the reconstructed signal. A different kind of spectrum can be used alternatively, for example, an order spectrum for an order analysis. Thus the sound or vibrations of rotating machines can be analysed. In contrast to the frequency analysis, the amplitude representing the energy content of the sound is not plotted via the frequency here but via the order, in which the order is a multiple of the rotational speed. Insofar this is a normalised spectrum. According to another alternative, the reconstructed signal can be a time signal that is back-transformed from a previously reconstructed spectrum.

A software application is also proposed for a mobile analysis device with a display, at least one control element and an acoustic sensor and optionally an optical sensor, comprising program instructions that, when they are executed by the analysis device, cause the analysis device to execute the method according to the present invention.

Furthermore, the invention relates to a machine-readable storage medium with such a software application. Finally, a mobile analysis device is also proposed, having a display, at least one control element and an acoustic sensor to capture an audio recording and optionally an optical sensor, in which the analysis device is configured to execute the method according to the present invention. In particular, the analysis device may contain the aforementioned storage medium for this purpose and can comprise a processor in order to execute the software application stored on the storage medium to execute the method.

While determining the state of the pump assembly and/or analysing the airborne sound emitted by the pump assembly for state identification (rotational speed or error) is performed in the manner that is in principle known to experts, a central idea of the invention is to determine amplitude values of a physical or mathematical parameter based on at least two audio signals recorded at different distances from the pump assembly, to compare these to each other, and to identify through this comparison which sound components are produced by the pump assembly or not, but by a secondary sound source, in order to then reconstruct a signal in which the sound components produced by this secondary sound source are eliminated. The procedure according to the present invention uses a distance law, i.e. the knowledge that the airborne sound emitted by the pump assembly at a first location with the first distance from the pump assembly has a first value, which must have changed at the second location with a second distance from the pump assembly to a certain second value that is determined according to natural law and therefore expected. This test for the validity of the distance law can be performed by comparing the amplitude values of a parameter in the first and second audio signals with each other, notably with regard to whether their ratio equals what is expected according to the distance law.

The airborne sound is recorded using an acoustic sensor. For example, the sound pressure level can be measured as the acoustic parameter of the airborne sound, so that the first and second audio signals respectively form a sound pressure level-time progression. The sound pressure level is a scalar parameter that follows the distance law 1/r, where r is the distance or radius from the pump assembly. In other words, the sound pressure level p is inversely proportional to the distance r ($p \sim 1/r$). From this it follows that the value of a sound pressure level p at a first location $p(r_1)$ with the distance $r_1$ to a reference point will be halved when the distance from the reference point is doubled to $r_2=2r_1$: $p(r_2)=0.5\cdot p(r_1)$. This can be considered in the comparison of the amplitude values according to the present invention in order to determine whether a certain frequency in the airborne sound was emitted by the pump assembly or by the secondary sound source.

The sound power or sound intensity can be used as alternatives to the sound pressure level. The sound power and sound intensity are energy parameters that respectively follow the distance law $1/r^2$, where r again is the distance or radius from the pump assembly. In other words, the sound intensity or sound power P is inversely proportional to the square of the distance $r^2$ ($I\sim 1/r^2$, $P\sim 1/r^2$). From this it follows that the value of a sound intensity I or a sound power P at a first location with a distance $r_1$ to a reference point will only be 25% of the original value when the distance from the reference point is doubled to $r_2=2r_1$: $I(r_2)=0.25\cdot I(n)$, $P(r_2)=0.25\cdot P(r_1)$.

Logically the acoustic sensor is or will be oriented toward the pump assembly. A microphone can be used as the sensor, preferably a directional microphone or a directionally adjustable microphone.

Logically there is a significant difference between the first and second distances. That means they differ by more than just a few millimetres or centimetres. Rather, the first distance should be at least 20%, preferably at least 50%, greater than the second distance. Ideally the first distance is about twice the second distance. That being said, the distance should also be chosen with regard to the distance between the pump assembly and the secondary sound source, ensuring that it is not too large in comparison to that. In particular, the first distance should be smaller than the distance between the pump assembly and the secondary sound source.

The amplitude values, for example, can be spectral components determined from the first and second audio signals. A spectral component means a component of a spectrum that describes a distribution function of the physical or mathematical parameter in the corresponding audio signal. Thus an amplitude value contains information about the quantity of a certain spectral component that is present in the corresponding audio signal.

According to one embodiment, a spectrum of the first and second audio signal is respectively determined to eliminate at least one ambient noise in the first and second audio signal. Subsequently, a ratio can be formed between amplitude values of corresponding spectral components of the two spectra or spectra derived from them, in which the reconstructed signal is formed using the amplitude values of those spectral components of one of the two spectra or the spectra derived from them for which the ratio lies beyond a certain limit value. The quotient of the aforementioned amplitude values can be used as the ratio.

For example, the spectra can be frequency spectra and the spectral components can be frequencies.

Alternatively the spectra may be order spectra in which the spectral components are orders, or more precisely multiples of a rotational speed.

Discrete spectra are preferable, enabling their numeric calculation and analysis.

It is advantageous for the reconstructed signal to be formed from the amplitude values of the spectral components of the second audio signal's spectrum or the spectrum derived from that, because this was recorded closer to the pump assembly, improving the ratio between the useful signal and noise.

In an advantageous embodiment, a number of dominant spectral components can first be determined from each of the two spectra and selected, in which these dominant spectral components with their amplitude values form the respective derived spectrum and a ratio of the amplitude values is subsequently formed. In other words, the respective derived spectrum corresponds to the respective spectrum of the first and/or second audio recording with regard to the dominant spectral components, but the amplitude values of the remaining spectral components are set to zero. The dominant spectral components may be called peaks in the spectrum. Figuratively speaking, the spectrum consisting of individual peaks is thinned using the described procedure. Thus the spectral components of the audio recordings caused by noise are filtered out. Subsequent signal processing is also less computationally intensive as a result.

The number X of dominant spectral components can be unknown in a variant. For example, the dominant spectral components may be determined by comparing their amplitude to a limit value, so that all spectral components that exceed this limit value are dominant. Their number cannot be given at the start of their determination in this case.

In another variant, the number N of dominant spectral components to be selected can however be given or specified. In this case, the frequencies to be selected are those belonging to the N spectral components with the highest amplitude. This variant filters out noise more effectively compared to using a limit value.

The specification of a number N of dominant spectral components to be selected may refer globally to the entire spectrum, which may extend from 0 to 20 kHz in case of a frequency spectrum, for example. Since the ratio between the useful signal and noise differs in different ranges of the spectrum (frequency bands), it is advantageous to divide the spectrum into m intervals and to determine a number $N_{I,peak}$ of dominant frequencies individually in each interval $I_x$ with x=1 to m. Here the number $N_{I,peak}$ can be the same for all intervals or different, notably established individually. This has the advantage that the spectrum as a whole can be divided into segments of greater or lesser interest. The segments of greater interest may be those known to contain frequencies caused or generated due to errors of the pump assembly. A higher number $N_{I,peak}$ of dominant frequencies can be used for these segments of greater interest than for the remaining segments.

For example, the spectrum as a whole can be divided into 2 to 20 segments. The segments may have the same or different spectral widths. In case of a frequency spectrum from 0 to 20 kHz, each segment or each interval may contain a spectral range (width) of 2 kHz, for example, in case of 10 intervals. The number $N_{I,peak}$ for each interval may be between 50 and 500, for example. In case of 500 selected spectral components, this means an interval with 2000 discrete spectral components (e.g. 2 kHz interval width) is already thinned by 75%. With 100 selected spectral components, the spectrum is thinned by 95%, considerably reducing the computing power for the subsequent analysis.

The dominant spectral components can be determined by applying a sorting algorithm. Thus the spectral components can be sorted according to their amplitude, in which the $N_{peak}$ or $N_{I,peak}$ spectral components with the largest amplitudes are selected.

The dominant spectral components are preferably determined by a) initially checking all spectral components sequentially to determine which spectral component has the highest amplitude, b) subsequently checking the remaining spectral components sequentially to determine which of these spectral components has the highest amplitude, and c) repeating step b) $N_{peak}-2$ times, where $N_{peak}$ is the number of dominant spectral components.

This method can be executed for the spectrum as a whole or preferably for each interval $I_x$ of the corresponding spectrum. In the latter case, steps a) through c) apply to the spectral components within an interval $I_x$ and are performed sequentially for each interval $I_x$.

For example, the discrete spectral lines of the spectrum are sorted according to a descending or ascending amplitude in each interval $I_x$. The dominant spectral components of an interval $I_x$ are the lines (peaks) with the $N_{I,peak}$ largest amplitudes. While the lines of the dominant spectral components remain in their positions, all other spectral lines are removed from the spectrum. Thus the spectrum is thinned. The resulting spectrum forms the derived spectrum.

Step by step, the following steps may be performed in case of an interval-based determination of the dominant spectral components:

a) For a first interval
   - a1) all spectral components of the first interval Ii are initially checked sequentially to determine which spectral component has the highest amplitude,
   - b1) subsequently, the remaining spectral components of the first interval Ii are checked sequentially to determine which of these spectral components has the highest amplitude, and
   - c1) step b1) is repeated $N_i-2$ times, where $N_i$ is the number of dominant spectral components in the first interval b) fora next interval
   - a2) all spectral components of the next interval are initially checked sequentially to determine which spectral component has the highest amplitude,
   - b2) subsequently, the remaining spectral components of the next interval are checked sequentially to determine which of these spectral components has the highest amplitude, and
   - c2) step b2) is repeated $N_{i+1}-2$ times, where $N_{i+1}$ is the number of dominant spectral components in the next interval and c) step sequence b) is repeated m−2 times, where m is the number of intervals $I_x$. Thus the dominant spectral components are determined sequentially for all intervals $I_x$.

As previously mentioned, the number $N_i$ or $N_{I,peak}$ of dominant spectral components may be the same for all intervals or established individually for each interval, and may vary between intervals. Thus a larger number of dominant spectral components can be determined in a first interval than in another interval. This makes it possible to account for the frequency band-specific particularities of the airborne sound produced by the pump assembly. For example, a higher number of dominant spectral components can be determined in the intervals where mechanical errors of the pump assembly are known to reveal themselves in spectral components of the spectrum than in other intervals where this is not the case, or that mainly consist of noise. A correspondingly smaller number of dominant spectral components can be selected in such intervals.

As mentioned above, the previously described steps a)-c) to determine the dominant spectral components are performed for the spectra of all audio signals.

The amplitude ratios are preferably formed in such a manner that, for one spectral component, a ratio of the amplitude value of the spectral component in the spectrum of the second audio signal or in the spectrum derived from that to the amplitude value of the corresponding spectral component in the spectrum of the first audio signal or in the spectrum derived from that is calculated. Once again the quotient of the aforementioned amplitude values can be used as the ratio.

Thus the higher amplitude value should always by the numerator, meaning the ratio is greater than 1. The ratios may also be called peak factors.

In detail, the amplitude ratios can be formed in an embodiment, for a spectral component $f_k$, by calculating the ratio $F_k$ of the amplitude value for this spectral component $f_k$ in the spectrum of the second audio signal or in the spectrum derived from that to the amplitude value of the same spectral component $f_k$ in the spectrum of the first audio signal or in the spectrum derived from that. This is then done for each, or at least every selected, spectral component $f_k$.

When the ratio of the amplitude values of the second to the first audio signal is formed from a spectral component, it is advantageous to only apply the aforementioned calculation rule when both aforementioned amplitude values are greater than zero in order to avoid division by zero. The ratio can be set equal to zero when one of the two amplitude values is equal to zero. Alternatively however, a data vector containing all ratios $F_k$ can be initialised with zero prior to the calculation of the ratios.

When only the $N_{peak}$ dominant spectral components are used, checking for zero is not essential since the amplitudes of these spectral components are always greater than zero. However, numeric processing of the present method is simplified when the ratios are formed sequentially for all $N_{total}$ spectral components $f_k$, with k as a continuous index from 0 to $N_{total}-1$.

Acoustic measurements taken at different times do not always produce exactly identical spectra from case to case, even when the source produces the same unchanged sound(s). From this it follows that a dominant spectral component of the second measurement/second audio signal does not necessarily lie at the same spectral location, or more precisely at the same index k of the discrete spectrum, as for the first measurement/audio signal. A spectral offset may therefore exist between the first and second audio recordings. Such a spectral offset is more likely the finer the chosen spectral interval, i.e. the resolution of the spectral components in the spectra of the audio signals. It is therefore highly likely that there will be no spectral offset at a low resolution, and the ratio can be formed using the amplitude values of the same spectral component $f_k$ in the spectrum of the first and second audio signals. On the other hand, an offset is possible and must be considered with a higher resolution.

A preferred embodiment can therefore provide for performing an offset correction in forming the amplitude ratios, by a. for the spectral component $f_k$, calculating the ratio $F_k$ of the amplitude value of the spectral component $f_k$ in the spectrum of the second audio signal or in the spectrum derived from that to the amplitude value of the same spectral component $f_k$ in the spectrum of the first audio signal or in the spectrum derived from that, when both aforementioned amplitude values are greater than zero, or b. for the spectral component $f_k$, calculating the ratio $F_k$ of the amplitude value of the spectral component $f_k$ in the spectrum of the second audio signal or in the spectrum derived from that to the amplitude value of the previous spectral component $f_{k_}$i in the spectrum of the first audio signal or in the spectrum derived from that, when both aforementioned amplitude values are greater than zero, or c. for the spectral component $f_k$, calculating the ratio $F_k$ of the amplitude value of the spectral component $f_k$ in the spectrum of the second audio signal or in the spectrum derived from that to the amplitude value of the next spectral component $f_{k+1}$ in the spectrum of the first audio signal or in the spectrum derived from that, when both aforementioned amplitude values are greater than zero.

Once again the quotient of the aforementioned amplitude values can be used as the ratio.

The second audio signal, i.e. the "near spectrum", is used as a reference in the aforementioned cases since its amplitude values are in the numerator. Naturally the first audio recording can be alternatively used as a reference as well.

In case a., there is no spectral offset between the peaks in the near and far spectrum. In case b. there is an upward spectral offset of the far spectrum for the spectral component $f_k$, i.e. the spectral component in the far spectrum corresponding to a spectral component $f_k$ in the near spectrum is offset in the amount of the spectral resolution $\Delta f=f_{k+1}-f_k$ of the examined spectra to the next higher index value k+1, so that the index of the spectral component in the far spectrum has to be reduced by 1 to correctly form the amplitude ratio. In other words, a peak in the spectral component $f_k$ of the second audio signal (near spectrum) corresponds to a peak in the spectral component $f_{k-1}$ of the first audio signal (far spectrum). In case c. there is a downward spectral offset of the far spectrum for the spectral component $f_k$, i.e. the spectral component in the far spectrum corresponding to the spectral component $f_k$ in the near spectrum is offset in the amount of the spectral resolution $\Delta f=f_{k+1}-f_k$ of the examined spectra to the next lower index value k−1, so that the index of the spectral component in the far spectrum has to be increased by 1 to correctly form the amplitude ratio. In other words, a peak in the spectral component $f_k$ of the second audio signal (near spectrum) corresponds to a peak in the spectral component $f_{k+1}$ of the first audio signal (far spectrum).

If none of the three cases a., b. or c. described above applies for the spectral component $f_k$, i.e. respectively one of the two amplitude values to form the ratio is zero, the ratio $F_k$ can be set to zero. Alternatively a data vector comprising the ratios $F_k$ of all spectral components $f_k$ can be initialised with zero prior to the calculation of the ratios. Thus the ratio $F_k$ is already zero when none of the three cases a., b. or c. described above applies for the spectral component $f_k$. If on the other hand one of the three cases a., b. or c. described above applies for the spectral component $f_k$, the value pre-initialised with zero for the ratio $F_k$ is replaced by the calculated value of the ratio $F_k$.

The simultaneous occurrence of multiple cases a., b., c. is prevented by the previous selection of the dominant spectral components, because this sets the amplitudes of most of the spectral components to zero. However, one or more rules can also be defined to handle the simultaneous occurrence of multiple cases. For example, when multiple cases a., b., c. occur, the largest ratio $F_k$ from all the cases can be used.

Preferably a check is performed after forming the ratios, where applicable after the offset correction, to find the spectral component where the amplitude ratio that has been determined exceeds the limit value. This check is preferably performed for all spectral components, or at least sequentially for the selected spectral components. The spectral components where this condition is met, i.e. the amplitude ratio that has been determined exceeds the limit value, along with the amplitude values from the spectrum of the second audio signal assigned to these spectral components, then form the reconstructed signal in the form of a reconstructed spectrum.

Ideally the limit value is established under consideration of a ratio between the two distances. Thus the aforementioned distance law that applies depending on the recorded acoustic parameter can be considered in the limit value. For example, when the sound pressure level is recorded as the acoustic parameter, the limit value can be established so that it reflects a proportional ratio of the first distance to the second distance. When the sound power or the sound energy is recorded as the acoustic parameter, the limit value can be established so that it reflects a quadratic ratio of the first distance to the second distance.

When the first and second distances are specified or the ratio between the first and second distances is specified for the execution of the method according to the present invention, the limit value is also known and established, and can be stored in the software application as a constant.

As previously noted, the second distance may be specified as half the first distance, for example, in which case these distances should be used as standard values. When using the sound pressure level, the limit value can have the value 2 in this case, or the value 4 when using the sound power or sound energy.

On the other hand, the first and second distances are to be measured when recording the first and/or second audio signal at a distance chosen by the operator is permitted, or when a check is to be performed whether a specified distance actually exists during the first and/or second recording. In this case, the limit value $F_{threshold}$ can be calculated based on the measured values, for example, from the ratio of the first to the second distance in case of the sound pressure level: $F_{threshold}=D_{far}/D_{near}$. Consequently, the limit value is variable in this case and is always recalculated from the distances $D_{far}$, $D_{near}$ that are determined. In case of the sound intensity or the sound energy, the ratio of the first to the second distance can be calculated as follows: $F_{threshold}=(D_{far}/D_{near})^2$.

The limit value can be weighted with a factor between 0.6 and 1, preferably 0.8 and 1. This takes measuring inaccuracies into account and prevents a spectral component belong to the pump assembly from being disregarded due to those measurement inaccuracies.

To improve the accuracy of this method, it is advantageous for the first geometric location, the second geometric location and the pump assembly to lie on a straight measuring line. It is also sensible for the measuring line to be perpendicular to a connecting line between the pump assembly and the secondary sound source, since the measuring line is nearly tangential to the sound field of the secondary sound source in this case. It is however optimal for the first geometric location and the second geometric location to lie on a circular path around the secondary sound source.

Note that the method proposed in the present description has limits. For the best possible elimination of ambient noise in the recorded audio signal, and to reliably and correctly determine the state of the pump assembly, the pump assembly and the secondary sound source(s) must be at a sufficiently large distance from each other in comparison to the measuring distances $D_{far}$, $D_{near}$. If this is not the case, the result of the elimination and consequently the state detection will deteriorate.

Furthermore, the operating state of the pump assembly should be the same while recording the first and second audio signals and should not change during recording in order for the method to obtain a high-quality result.

As previously mentioned, a further improvement of the method according to the present invention is to take at least one additional measurement, i.e. to record a third audio signal, namely at a third distance from the pump assembly that is greater than the second distance but preferably less than the first distance. Thus the third distance lies between the first and second distances. All process steps previously described with regard to the first and second audio signals can be applied correspondingly to the third and second audio signals. Thus a ratio of their amplitude values can also be formed, so that an amplitude ratio of the third audio signal to the second audio signal can also be calculated here for each spectral component $f_k$. This respective amplitude ratio can be used to verify an assumption resulting from the spectral comparison of the second audio signal with the first audio signal, that a certain spectral component $f_k$ actually belongs to the pump assembly 1 being analysed. If an amplitude ratio $F_k$ calculated from the first and second audio signals for a certain spectral component $f_k$ lies beyond the limit value $F_{threshold}$, so that this spectral component is a potential candidate for a spectral component produced by the pump assembly, an additional amplitude ratio can be calculated from the third and second audio signals for the spectral component $f_k$. This is then compared to a limit value as well in order to verify the assumption. This limit value is then formed by the ratio of the third distance to the second distance, where applicable also weighted with a factor between 0.6 and 1. Only when this condition is met in addition can it be assumed that the spectral component $f_k$ is a spectral component produced by the pump assembly.

The same procedure can be applied to additional optional measuring positions.

According to an especially advantageous embodiment of the present invention, the distances are respectively determined with an optical measurement by recording the pump assembly using an optical sensor, respectively from the first and second geometric locations. The optical sensor may, for example, be a laser distance measuring device that determines the distance between the analysis device and the pump assembly using a laser beam and a time-of-flight measurement.

Alternatively the optical sensor can be a camera used to visually record the pump assembly in an image, in which this image is evaluated, preferably in real time. The disadvantages of elaborately determining an appropriate position for the hand-held unit and/or the microphone based on a real-time analysis of the acoustic signal with regard to the signal quality and amplitude, as described in the preamble, are overcome by the proposed optical distance measurement. It is an objective indicator for using the correct distance for the audio recording. Thus the user is enabled to position the analysis device at a specified distance from the pump assembly and therefore to record the audio signals at the correct respective distance.

In addition, there is no need for the user to take multiple recordings to detect an error in the pump assembly. Additional measuring tools such as a folding rule or measuring tape are not needed to correctly determine the distance either. The measurement can also be taken with one hand that holds the analysis device. However, the analysis device may also be mounted on a stand. A straightforward and user-friendly method for distance measurement, for and notably during an acoustic measurement of a pump assembly, is therefore provided.

The visual measurement can be taken in the known manner according to the state of the art. Methods for determining a spatial distance from a camera to an object recorded by it, as such, are known. Please refer to the applicable literature, for example, EP 2669707 A1, WO 2015/144775 A1, US 2011/0025845 A1, US 2021/0254962 A1, US 2019/0340799 A1, EP 326249 9B1 or U.S. Ser. No. 10/489,033 B2.

According to an embodiment, the optical, notably visual measurement is performed simultaneously with the recording of the respective audio signal. Thus the distance at the time of recording the respective audio signal is known to the analysis device.

The distance can be measured before, during or after recording, for example. It is also possible for the distance to be measured multiple times, notably continuously during the respective recording.

It is advantageous for the distance to be determined twice, for example, once at the start or before the recording and a second time at the end or after the recording. This has the advantage that the second measured distance can be used to verify that the distance has not changed significantly during the recording compared to the first measured distance. The first measured distance can be used for the subsequent process.

The duration of recording can, for example, be in the range of 5 seconds to 20 seconds, preferably 10 seconds.

For storage, the respective measured distance is ideally assigned to the corresponding audio signal, notably the corresponding audio recording, for example, in the form of what are called meta data.

After the distance is determined, it can be shown on the display of the analysis device, notably while the respective recording is in progress.

According to an advantageous embodiment, an abort criterion can be used to abort the recording if the distance changes by more than 3%, preferably by more than 5%, during the recording. In this case the user can be asked to keep their hand steady with a corresponding notice on the analysis device.

During visual distance measurement, the recorded image can be shown on the display of the analysis device. The reference points can also be entered in the image and displayed, for example, using colour-coded circles overlaid on the pump assembly. This can be called an augmented reality measurement (AR measurement). The distance determined from the recorded image can also be shown on the display of the analysis device, for example, in the form of numeric data.

The limit value is preferably calculated from the ratio of the two distances that are determined. This has the advantage that time-consuming positioning of the analysis device at a certain specified distance from the pump assembly can be omitted. Thus the first and second audio signals can in principle be recorded from any distance. Nevertheless, distances can of course be recommended as guiding values, for example, 25 cm and 50 cm, 30 cm and 60 cm, 40 cm and 80 cm, etc.

The mobile analysis device may consist of one, two or more parts. The software application is preferably loaded on the analysis device, notably on a central component with at least one processor and at least one data storage medium (RAM, EEPROM), or rather installed for its execution. The acoustic sensor and/or the optical sensor can form an integral component of the analysis device in an embodiment. Ideally the analysis device is a smartphone, tablet computer or laptop, since these devices are routinely equipped with integrated cameras and microphones.

However, the optical sensor and/or the acoustic sensor can also constitute a separate part from the central component, more precisely put with an own casing that has a data connection to the central component, for example, using a cable or wireless link. In this case the smartphone, tablet computer or laptop is the central component. This has the advantage that a better microphone than the one integrated in the central component can be used, for example, with special directional characteristics, and/or a better camera than the one integrated in the central component, for example, one with a higher resolution, or a different optical sensor can be used for the distance measurement. When the optical and/or acoustic sensor are devices respectively connected to the central component, they jointly form the analysis device, which is a three-part device in this embodiment.

In a preferred embodiment, the analysis device consists of a smartphone and a casing with a holder that holds the smartphone, in which at least one acoustic sensor for taking the audio recording is integrated in the casing and a data connection between the sensor and the smartphone can be established over an interface integrated into the holder. The interface can be a mechanical, electrical interface that is contacted when the smartphone is inserted into the holder, so that an electrical connection between the smartphone and acoustic sensor is established simultaneously during this insertion. The camera integrated in the smartphone can be used to record the image.

In the same manner, the holder can however have an optical sensor in addition to the acoustic sensor, notably a camera to record an image of the pump assembly.

The holder may have a handle so that it can be held in one hand, in a manner that the person holding it can see the display of the smartphone.

Additional characteristics, advantages and properties of the invention are explained in the following using embodiments of the invention and the attached figures that illustrate those examples. Identical reference numbers or reference marks in the figures identify components, objects or process steps that are identical or at least have the same effect.

Although a characteristic of the invention described above or below may be disclosed in conjunction with a concrete embodiment, please note that this characteristic may also be present in another embodiment, insofar as its transfer to that other embodiment of the invention is not excluded.

Please note that the terms “have”, “comprise” or “contain” in no way exclude the existence of additional characteristics within the scope of the present description. Furthermore, the use of the indefinite article for an object does not exclude its plural.

LIST OF FIGURES

FIG. 1: A pump assembly according to the state of the art

FIG. 2: Perspective view of an analysis device according to the present invention, from the front FIG. 3: Perspective view of an analysis device according to the present invention, from the rear FIG. 4: Idealised analysis setup with two sound sources and two measuring positions FIG. 5: Combined spectra of the first and second audio recordings FIG. 6 through 12: Flow charts of the method FIG. 13: Comparison of the reconstructed spectrum with the original spectrum of the pump assembly.

FIG. 1 shows an exemplary pump assembly 1 according to the state of the art, comprising a pump unit 2, an electric motor 3 driving the same, and pump electronics 4 to control and/or regulate the electric motor. The pump unit 2 is a multiple-stage, normal-priming, vertical high-pressure centrifugal pump in an inline design, i.e. the suction nozzle 5 and the pressure nozzle 6 of the pump casing 9 lie in one line. The electric motor 3 is a wet rotor motor with no mechanical seal. The electric motor 3 and pump unit 2 have a continuous shaft on which multiple impellers are mounted using torque proof connections. The pump assembly 1 with the pump casing 9 stands on a pump base plate 7 for foundation mounting.

Stage casings lying axially on top of each other are arranged within a casing pipe 8 of the pump casing 9. Each of them contains one of the impellers to respectively convey the pumped liquid to the next stage casing. The final, axially uppermost impeller conveys the pumped liquid into an annular space between the stage casings and the casing pipe 8, where it leaves the pump casing 9 through the pressure nozzle 6. The casing pipe 8 provides sealing for operational reliability.

The pump electronics 4 comprise a frequency converter to continuously adjust the rotational speed of the electric motor 3 between a minimum and maximum rotational speed. The pump assembly 1 is used to convey cold and hot water and other liquids without abrasive or fibrous substances. Water supply and pressure boosting systems, industrial circulation systems, process technology, cooling water circuits, fire extinguishing systems, and washing and irrigation systems are the main fields of application.

FIGS. 2 and 3 show a mobile analysis device 10 according to the present invention from the front and rear. Here “front” refers to the side of the analysis device 10 that a user views during an audio recording, while “rear” is the side of the analysis device 10 that faces the pump assembly 1 during an audio recording in the course of intended use. The analysis device 10 is in several parts. It comprises a casing 11 that holds analysis electronics, a handle 13 connected to the casing 11 to hold the analysis device 10, a holder 14 for a smartphone 15 and a smartphone 15 positioned in the same. The casing 11 is joined to the handle 13 by a form-locked dovetail connection.

The analysis electronics comprise an acoustic sensor 12 in the form of a microphone, which is positioned in front of an opening on the rear of the casing 11 facing away from the user, in order to record airborne sound from an object that reaches the analysis device 10 along an acoustic path 12*a*. The microphone can be a directional microphone. For pre-processing, for example, amplification, filtering and digitalisation, the analysis electronics have a means of signal processing with at least one processor, for example, a digital signal processor (DSP), and at least one storage medium. A communication interface to the smartphone 15 is also part of the analysis electronics, consisting of an electrical-mechanical component, at least partly integrated into the holder 14, that is contacted by a corresponding mating interface when the smartphone 15 is inserted into the holder 14, and of software for the protocol-based transmission and receiving of data over the communication interface to and from the smartphone 15.

In addition, the analysis electronics comprise a first interface 18*a* in the form of a USB interface, which serves as the power supply, and a second interface 18*b* in the form of a cinch connector as the data interface for the connection of an additional sensor, for example, a vibration sensor. Separating the power supply and data transmission has the advantage that the risk of interference signals is reduced. However, the power supply and data transmission can also be realised using a single common interface in a different embodiment, for example, a USB interface.

The smartphone 15 has a commonly known display 16 in the form of a touch-sensitive display, simultaneously forming a control element of the smartphone 15. A software application generally known as an "app" is loaded on a storage medium of the smartphone 15, configured to execute a method for analysing the state of at least one component 2, 3, 4 of the pump assembly 1, notably with regard to an error state, through the acoustic analysis of the airborne sound emitted by the pump assembly 1. Insofar the software application forms a software for the analysis of acoustic signals. It comprises corresponding technical program instructions that, when they are executed by the analysis device 10, or more precisely by a processor of the smartphone 15, cause the analysis device 10 to execute the method. Here the smartphone 15 controls the analysis electronics, respectively the acoustic sensor.

The smartphone 15 has an additional camera 17 installed on the rear in the state of the smartphone 15 when it is held in the holder 14, i.e. on the back side of the smartphone 15 facing away from the user, so that it can record images along an optical path 17*a* that is essentially parallel to the acoustic path 12*a*.

The method for analysing the state of the pump assembly through the acoustic analysis of the airborne sound emitted by the pump assembly 1 is explained below. FIGS. 6 through 12 show flow charts with the individual process steps.

The basic concept of the analysis method according to the present invention is to differentiate between multiple simultaneously existing sound sources $S_{primary}$, $S_{secondary}$ (see FIG. 4) based on their spectra through repeated acoustic measurements with variation of the measuring position in space, where the frequency spectrum is used in the present example and thus the spectral components are frequencies. Through variation of the measuring position and subsequent algorithmic data analysis, the measured acoustic signals are transformed into combined spectra 30, 40 (see FIG. 5), the primary sound source $S_{primary}$ is spectrally separated from the secondary sound source(s) $S_{secondary}$, and the separated/reconstructed spectrum of the primary sound source $S_{primary}$ is output for further processing at will.

In the present example, a combined spectrum is a frequency spectrum containing frequency components of both the primary sound source $S_{primary}$ and the secondary sound source $S_{secondary}$.

Figure 4:
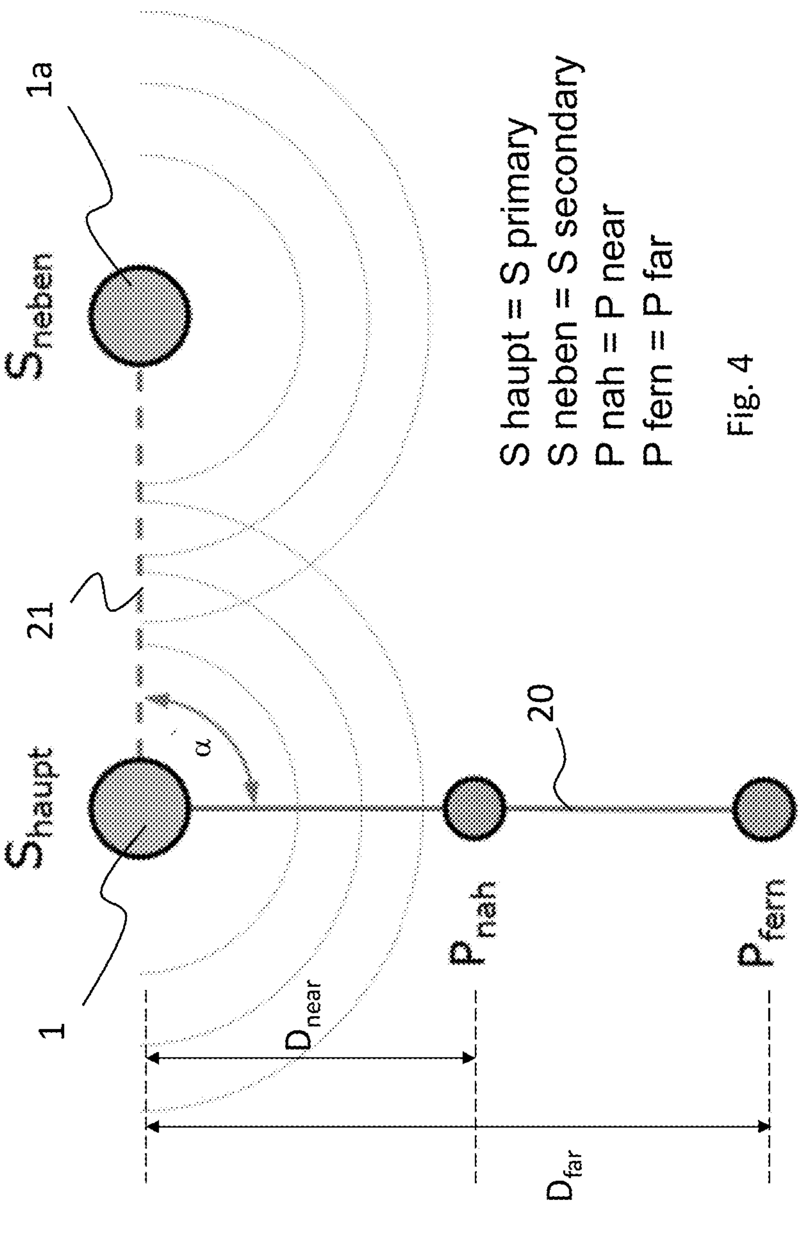

FIG. 4 shows an idealised analysis setup illustrating the basic concept of the present invention to eliminate ambient noise of a secondary sound source $S_{secondary}$ in the analysis of the pump assembly 1, which here forms the primary sound source $S_{primary}$. The secondary sound source $S_{secondary}$ can, for example, be an additional pump assembly 1*a* that is installed and operated next to the pump assembly 1 being analysed.

Even though only two sound sources $S_{primary}$, $S_{secondary}$ and only two measuring positions $P_{far}$, $P_{near}$ are used for the execution of the method in the present example, so as to improve comprehension, the method can also be applied with multiple secondary sound sources and may comprise more than two measurements at different locations. However, in the simplest case, the analysis setup as shown in FIG. 4 consists of two sound sources, namely the primary sound source $S_{primary}$ and the secondary sound source $S_{secondary}$, and of two measuring positions, namely a first measuring position $P_{far}$ at a greater distance $D_{far}$ from the primary sound source $S_{primary}$ and a second measuring position $P_{near}$ at a lesser distance $D_{near}$ from the primary sound source $S_{primary}$.

Optimally the two measuring positions $P_{far}$, $P_{near}$ lie on a measuring curve that corresponds to a circular path around the secondary sound source $S_{secondary}$. However, this is not always feasible in practice.

Therefore, the primary sound source $S_{primary}$ and the two measuring positions $D_{far}$, $D_{near}$ lie on a measuring line 20 and in a horizontal measuring plane. Here this line 20 is also orthogonal to a connecting line 21 between the two sound sources $S_{primary}$, $S_{secondary}$, although it may lie at a different angle α to the connecting line 21 in practice. Here the orthogonality between the measuring line 20 and the connecting line 21 and the use of the measuring positions $P_{far}$, $P_{near}$ at the least possible distance from the primary sound source $S_{primary}$ (in comparison to the distance between the primary sound source $S_{primary}$ and the secondary sound source $S_{secondary}$), preferably less than the distance between the primary sound source $S_{primary}$ and secondary sound source $S_{secondary}$, ensure that one moves tangentially to the sound field of the secondary sound source $S_{secondary}$ as far as possible. The secondary sound source $S_{secondary}$ may therefore lie outside the horizontal measuring plane.

The analysis method comprises the recording of a first audio signal in a first audio recording during operation of the pump assembly 1 at a first geometric location $P_{far}$ with a first distance $D_{far}$ from the pump assembly 1, and the recording of a second audio signal in a second audio recording during operation of the pump assembly 1 at a second geometric location $P_{near}$ with a second distance $D_{near}$ from the pump assembly 1, which is less than the first distance $D_{far}$. Thus the first audio recording comprises audio data of a far measurement, the second audio recording audio data of a near measurement. The two locations $P_{far}$, $P_{near}$ lie on a measuring line 20 with the pump assembly 1 on which the acoustic analysis is performed. The recordings are respectively taken using the acoustic sensor 12, controlled by the software application on the smartphone 15.

The sensor 12 records the sound pressure level p of the airborne sound emitted by the pump assembly 1 which, in the present example, is however overlaid by the airborne sound of an adjacent sound source that is thus recorded at the same time. The sensor 12 supplies an analogue electrical signal that represents the sound pressure level-time progression. This sensor signal is digitalised by the analysis electronics, previously or subsequently amplified and/or filtered if necessary, buffered and subsequently provided to the software application as an audio recording, which correspondingly reads the audio recording in order to process it. This is done for both the first and the second audio recording. Thus an audio recording comprises the digitalised sound pressure level-time progression.

The state of the pump assembly 1 is determined by analysing a frequency spectrum 50 of the pump assembly 1 corrected for the ambient noise of the secondary sound source 1*a*, which is reconstructed through a comparison of amplitude values of frequencies determined from the first and second audio recordings. This is explained below.

Figure 6:
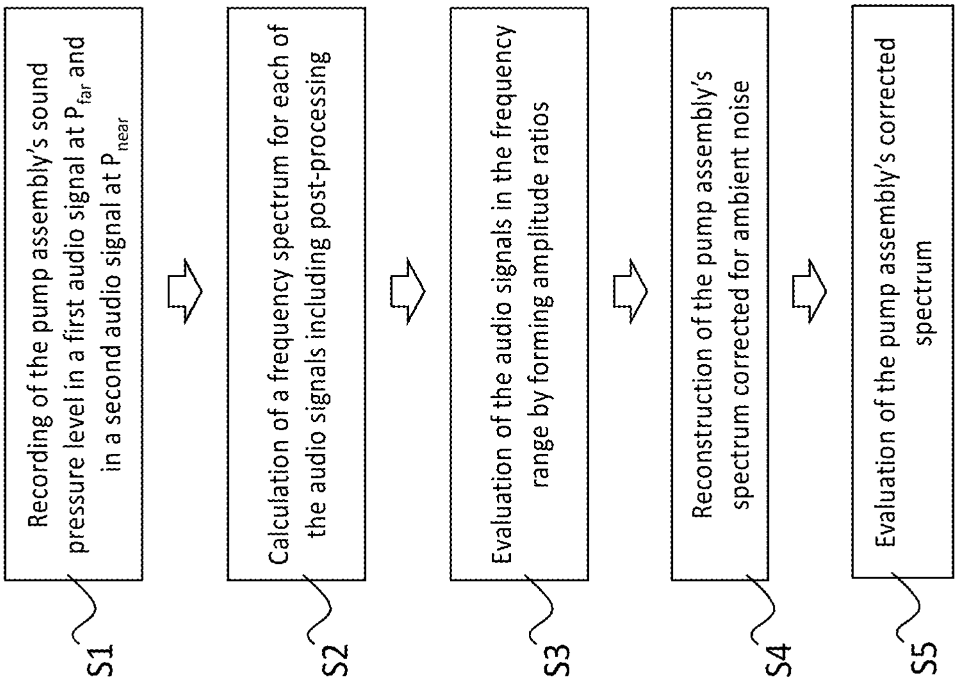

FIG. 6 shows a rough outline of the procedure, beginning with the recording of the first and second audio signals of the pump assembly 1, as described above, including the ambient noise of the secondary sound source(s) la $S_{secondary}$ at the measuring positions $P_{far}$, $P_{near}$ in step S1. This is the starting point of the examination that follows. The procedure continues with the following three steps, forming the core of the method for the spectral-based differentiation of multiple sound sources $S_{primary}$, $S_{secondary}$:

In step S2: Calculation and analysis of the combined spectra for all measuring positions.

The frequency spectrum 30, 40 is calculated here for each of the audio signals, including post-processing.

In step S3: Calculation of the spectral amplitude ratios.

The audio signals in the frequency range are analysed here by forming amplitude ratios for corresponding frequencies in the spectra 30, 40 of the first and second audio signals.

In step S4: Reconstruction of the spectrum for the primary sound source $S_{primary}$.

Here the spectrum 50 of the pump assembly 1, corrected for ambient noise, is reconstructed.

These three core steps S2, S3, S4 are followed by the analysis of the corrected spectrum 50 of the pump assembly 1 in step S5. This includes the actual determination of the state of the pump assembly 1, for example, determination of the rotational speed and/or the general detection of an error state and, where applicable, the identification of a concrete error. Note that this analysis as such is not part of the present invention. Please refer to the applicable technical literature in this regard.

Figure 7:
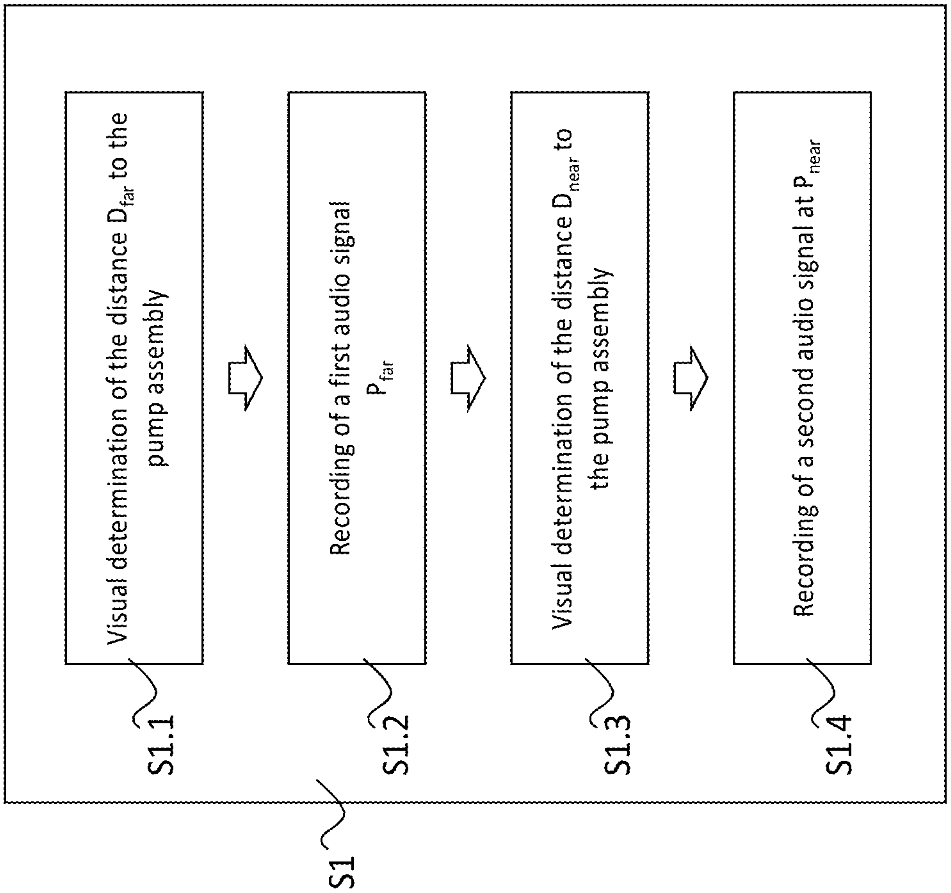

FIG. 7 illustrates the sub-steps of step S1. First the user moves the analysis device 10 to the first measuring position $P_{far}$.

The distance $D_{far}$ from the pump assembly 1 is first determined visually in step S1.1. The camera 17 in the smartphone 15 is used for this purpose and controlled by the software application. The camera 17 captures the pump assembly 1 and records at least one image, if applicable a video, which is analysed in real time. This is done by identifying prominent reference points 19 on the surface of the pump assembly 1 in the image, which are used to form a reference plane and to determine the distance $D_{far}$ between the camera and the reference plane along a measuring line that is orthogonal to the reference plane. The distance $D_{far}$ that is determined is assigned to the first audio signal and stored.

During determination of the distance (measuring), the user has to hold the analysis device 10 as still as possible so the distance remains constant during measuring. Information about the quality of maintaining the position may be shown on the display 16, for example, graphical information. For example, a green circle around the pump assembly 1 can indicate that the distance is being maintained. On the other hand, a red circle around the pump assembly 1 on the display 16 can indicate that the change in position while determining the distance is too large. Measuring has to be repeated in this case. Maintaining the measuring position can thus be checked visually on the display 16, notably the smartphone display, during measuring.

Following the visual determination of the distance $D_{far}$, the first audio signal is recorded in a first audio recording at the first measuring position $P_{far}$ in step S1.2. As previously explained above, this comprises recording the airborne sound emitted by the pump assembly 1 including the ambient noise of the secondary sound source(s) la using the acoustic sensor 12, where applicable also pre-processing, amplification and/or filtering as well as digitalisation and storage of the sensor signal as a sound pressure level-time progression, in order to supply this to the software application on the smartphone 15 as the first audio recording.

Although visually determining the distance in step S1.1 in FIG. 7 occurs before the recording in step S1.2, visually determining the distance can of course also occur during or after the recording in step S1.2. It is indeed preferable for the distance to be determined during the entire duration of the recording, notably to be repeated, so that the distance currently determined can be shown on the display 16. Determining the distance takes less time than recording.

Now the user moves the analysis device 10 to the second measuring position $P_{near}$. Visually determining the distance $D_{near}$ from the pump assembly 1 follows in step S1.3. This is done as in step S1.1. The camera 17 in the smartphone 15 is used again, controlled by the software application, and the distance $D_{near}$ between the camera 17 and the reference plane 19 is determined as in step S1.1. The distance $D_{near}$ that is determined is assigned to the second audio recording and stored.

Subsequently the second audio signal is recorded in a second audio recording at the second measuring position $P_{far}$ in step S1.4. This is done as in step S1.2. Once again this comprises the recording of the airborne sound of the pump assembly 1 including the ambient noise of the secondary sound source(s) using the acoustic sensor 12, where applicable also pre-processing, amplification and/or filtering as well as digitalisation and storage of the sensor signal as a sound pressure level-time progression, in order to supply this to the software application on the smartphone 15 as the second audio recording.

Again, although visually determining the distance in step S1.3 in FIG. 7 occurs before the recording in step S1.3, visually determining the distance can of course also occur during or after the recording in step S1.4. Again, it is preferable for the distance to be determined during the entire duration of the recording, notably to be repeated, so that the distance currently determined can be shown on the display 16.

Finally, note that while recording the second audio signal (near recording) at the measuring position ($P_{near}$) that is closer to the pump assembly 1 takes place after recording the first audio signal (far recording) at the measuring position ($P_{far}$) that is farther from the pump assembly 1 in the example shown here, this sequence can of course also be reversed. Visual distance measurement is highly advantageous because, as a result, the software application directly obtains the distance at which the first and second audio signals are respectively recorded, so that these recordings do not necessarily have to be recorded at a specified distance expected by the software application. Thus steps S1.1 through S1.4 can be executed in any order, for example:

S1.1.→S1.2→S1.3→S1.4
S1.2.→S1.1→S1.3→S1.4
S1.1.→S1.2→S1.4→S1.3
S1.2.→S1.1→S1.4→S1.3
S1.3.→S1.4→S1.1→S1.2
S1.4.→S1.3→S1.1→S1.2
S1.3.→S1.4→S1.2→S1.1
S1.4.→S1.3→S1.2→S1.1

Furthermore, steps S1.1 and S1.2 and/or S1.3 and S1.4 can be executed simultaneously in an embodiment as previously mentioned. All that needs to be considered here is that an audio recording and a distance measurement always form a dedicated data pair and thus have to be synchronous.

A conventional data format such as a WAV file (waveform format), preferably a format that contains the corresponding sound pressure level-time progression as uncompressed raw data, can be used for the aforementioned storage of the first and second audio signals, respectively in an audio recording.

The recording of the first and second audio signals, i.e. the digital sound pressure level-time progressions, is initiated by the software application. Insofar the analysis electronics constitute a peripheral device that is connected to the software application and supply the data required for analysis. Thus the recording of the first and second audio signals is followed by their transmission from the analysis electronics to the smartphone 15 as an intermediate step not shown in FIGS. 6 and 7, in which the software application pre-processes and/or analyses the audio recordings. From the perspective of the software application, this constitutes reading the sound pressure level-time progression/the sensor signal.

Note that pre-processing and/or analysing the audio signals, alternatively to the smartphone 15, can occur on a server, with the smartphone 15 transmitting the recorded audio signals, preferably including the distances $D_{near}$, $D_{far}$ that were determined, to the server. Thus at least a part of the software application can be executed on a server (in a cloud).

Figure 8:
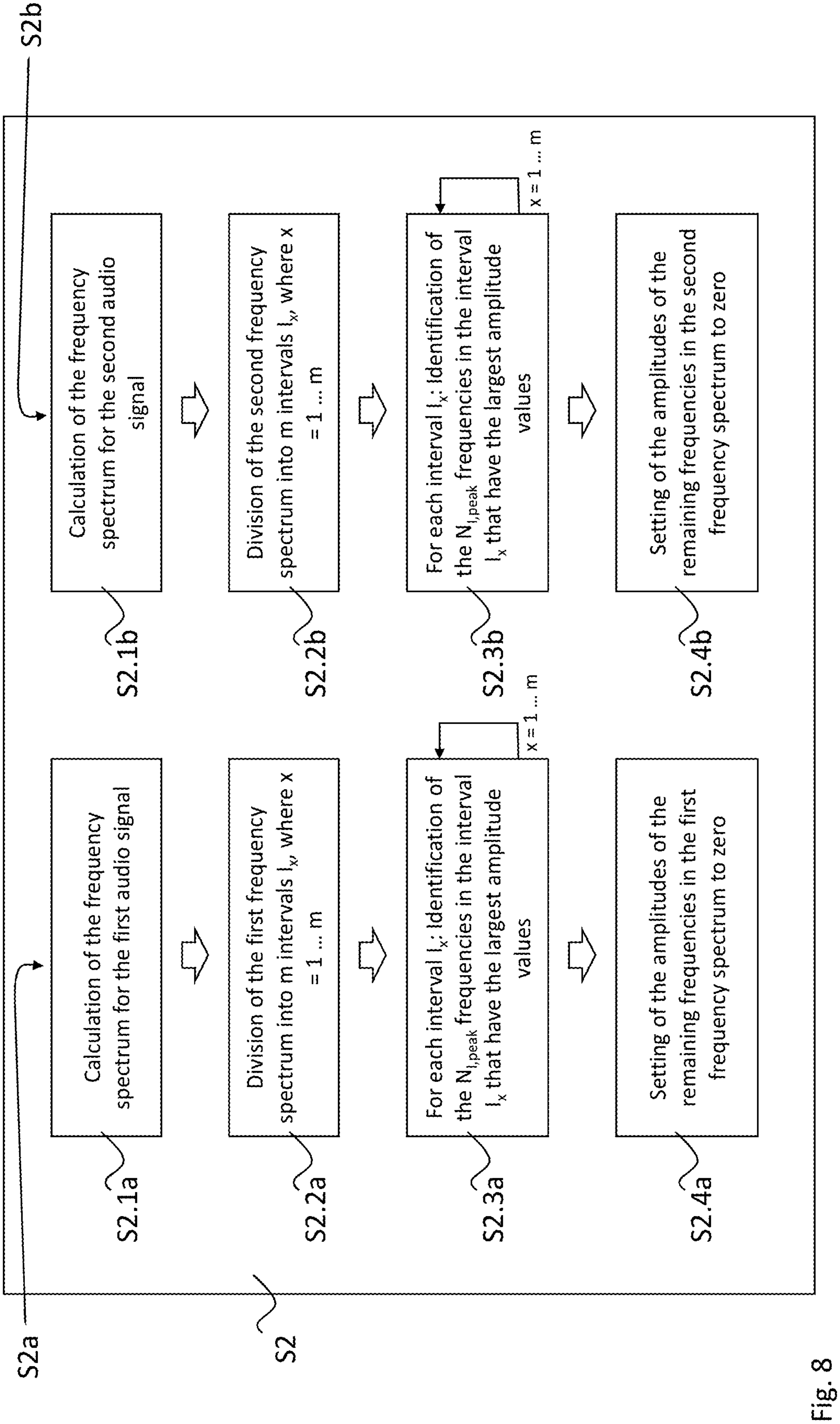

This transmission/reading is followed by the calculation of the sound pressure level-frequency spectra of the audio signals in step S2 by means of an FFT (Fast Fourier Transform) analysis and its post-processing. FIG. 8 shows the sub-steps in the form of two parallel paths S2*a*, S2*b*, which comprise the same steps, but are applied to the first audio signal on the one hand and the second audio signal on the other hand. The parallel paths S2*a*, S2*b* can be executed sequentially in time or alternately step by step.

Figure 5:
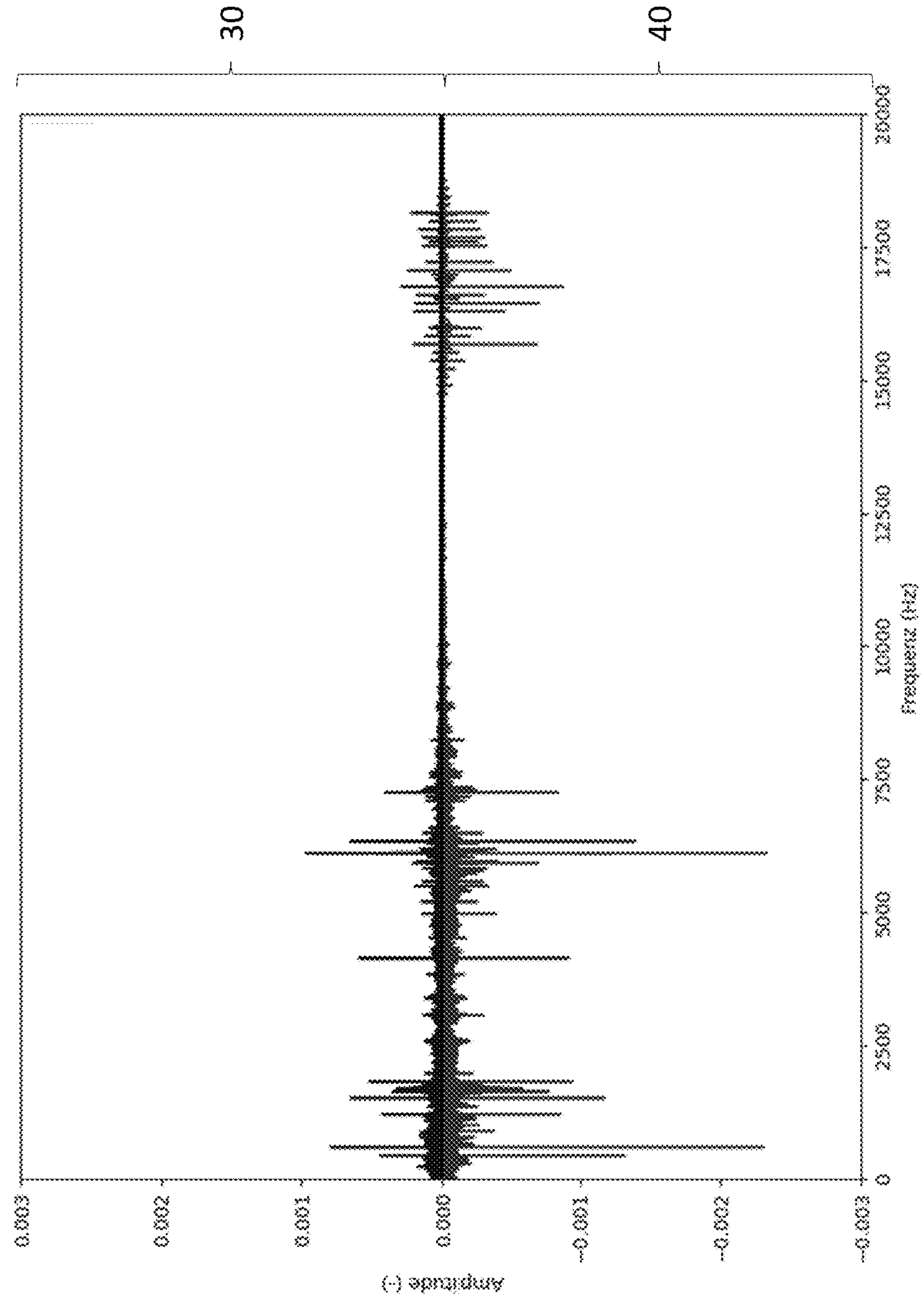

In the first path S2*a*, the sound pressure level-frequency spectrum 30 of the first audio signal is first calculated in step S2.1*a*, followed by the calculation of the sound pressure level-frequency spectrum 40 of the second audio signal in the second path S2*b* or following the first path S2*a* in step S2.1*b*. The two frequency spectra 30, 40 are shown in FIG. 5, or more precisely contrasted with each other in a uniform diagram, in which the amplitude values of the spectrum 40 of the second audio signal have a negative leading sign. It is evident that the amplitude values of the frequencies in spectrum 30 of the first audio signal are smaller than the amplitude values of the frequencies in spectrum 40 of the second audio signal, because the second audio signal (at the bottom in FIG. 5) was recorded closer to the pump assembly 1 than the first audio signal and the airborne sound at the second measuring location is correspondingly stronger compared to the first measuring location, i.e. the sounds are louder closer to the pump assembly than farther away from it.

Post-processing that now follows comprises an elimination of noise from the signal and simultaneous thinning of the frequency spectrum, simplifying subsequent signal processing and requiring less computing power. This post-processing comprises a selection of dominant frequencies within the sound pressure level frequency spectra. Dominant frequencies are those frequencies with a comparatively higher amplitude value. In other words, the most relevant peaks in the spectrum are identified and used for the subsequent analysis. In the embodiment described here, the selection is interval-specific, i.e. respectively for one interval out of a number of frequency intervals (frequency bands) into which the frequency spectrum is divided. Post-processing/frequency selection takes places respectively in steps S2.2*a*-S2.4*a* and S2.2*b*-S2.4*b*.

Division of the first frequency spectrum 30, i.e. the spectrum 30 of the first audio recording, into m intervals takes place in a first step S2.2*a* in the first path S2*a*. For this purpose, the frequency spectrum 30 is examined along the frequency axis as an overall interval $I_{total}$, ranging from a minimum frequency $f_{min}$ to a maximum frequency $f_{max}$, $I_{total}=[f_{min}, f_{max}]$. Alternatively the overall interval $I_{total}$ can be cut out of the overall frequency spectrum 30 so that the minimum frequency $f_{min}$ and the maximum frequency $f_{max}$ are established, deviating from the actual frequency scope in the frequency spectrum 30. For example, the minimum frequency $f_{min}$ may be=20 Hz and the maximum frequency $f_{max}$=20 kHz. Logically all intervals have the same spectral width in order to simplify signal processing. However, they may also have different spectral widths.

The same procedure is following in the first step S2.2*b* in the second path step S2*b*, where the second frequency spectrum 40, i.e. the spectrum 40 of the second audio recording, is divided into m intervals.

After the first step S2.2*a*, frequency selection is performed in a second step S2.3*a*. On closer examination, this initially consists of identification. For each interval $I_x$ (with x from 1 to m), a number $N_{I,peak}$ of the frequencies $f_k$ in the interval $I_x$ with the largest amplitude values is identified. The number $N_{I,peak}$ can be the same for all intervals $I_x$ or a different number may be specified. The latter provides the option to treat the intervals differently. For example, fewer frequencies $f_k$ can be selected where more noise occurs, and more frequencies $f_k$ can be selected where a useful signal tends to be expected. For example, between 50 and 500, preferably 100, dominant frequencies $f_k$ can be selected per interval. This can be realised by identifying all frequencies $f_k$ of an interval $I_x$, respectively with an index value k, sorting them by their amplitude value (ascending or descending), and selecting the first $N_{I,peak}$ frequencies in case of descending sorting or the last $N_{I,peak}$ frequencies $f_k$ in case of ascending sorting. This procedure is carried out for each interval $I_x$, i.e. repeated iteratively from x=1 to m.

The same procedure is followed in the second step S2.3*b* in the second path S2*b* where, for each interval $I_x$ (with x of 1 to m), a number $N_{I,peak}$ of the frequencies $f_k$ in the interval $I_x$ with the largest amplitude values is identified.

The identification of the dominant frequencies $f_k$ is followed by their selection in the third step S2.4*a* in the first path S2*a*. This is done by setting all other, i.e. non-dominant frequencies $f_k$ to zero, so that quasi only the dominant frequencies $f_k$ form the spectrum of the first audio signal, which is regarded as a derived (modified) frequency spectrum of the first audio signal due to this modification. Thus the dominant frequencies $f_k$ are automatically selected. Alternatively the identified dominant frequencies can be written to a new data vector, which quasi describes an empty spectrum.

The same procedure is followed in the third step S2.4*b* in the second path S2*b*, in which the amplitudes of all other frequencies $f_k$, i.e. those that were not identified, are set to zero, so that quasi only the dominant frequencies $f_k$ form the spectrum of the second audio signal, which is regarded as a derived (modified) frequency spectrum of the second audio signal due to this modification.

The described post-processing in the form of frequency selection eliminates noise in the sound pressure level frequency spectra. Furthermore, the data volume is considerably reduced so that the further processing of the derived (modified) frequency spectra requires less computing power. For example, when the frequency range from 1 Hz to 20,000 Hz is divided into 10 equal intervals of 2000 frequencies each, selecting the 100 dominant frequencies means that the frequency spectrum is thinned by 95% since the amplitudes of 1900 frequencies are set to zero.

Figure 9:
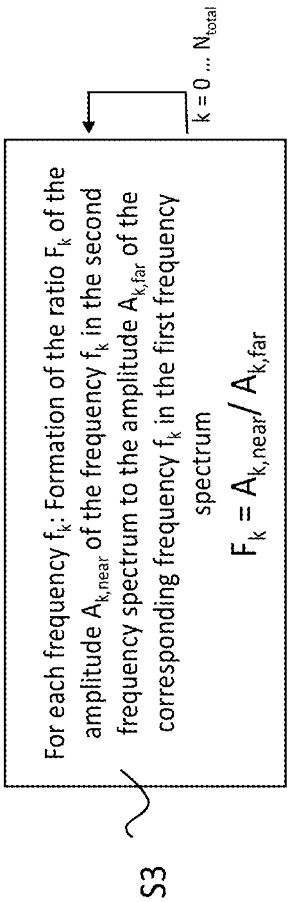

An implementation of step S3 is shown in FIG. 9. Here the ratio $F_k$ of the amplitude $A_{k,near}$ of the frequency $f_k$ in the derived frequency spectrum of the second audio signal (near spectrum) to the amplitude $A_{k,far}$ of the corresponding frequency $f_k$ in the derived frequency spectrum of the first audio signal (far spectrum) is formed for each frequency $f_k$. The ratios $F_k$ can be called peak factors and are calculated as follows:

$$F_k = A_{k,near}/A_{k,far}$$

The calculation is performed iteratively for all $N_{total}$ frequencies $f_k$ in sequence, where k is the continuous index of the discrete frequency axis of the spectra and assumes the values from k=0 to $N_{total}$.

To avoid division by zero, a condition can be applied prior to the calculation of each ratio $F_k$, checking whether the amplitude $A_{k,far}$ of the frequency $f_k$ in the derived frequency spectrum of the first audio signal (far spectrum) is greater than zero. The amplitude ratio $F_k$ is set to zero when this is not the case, and otherwise calculated as described above. Alternatively the condition can check whether the amplitude $A_{k,far}$ of the frequency $f_k$ in the derived frequency spectrum of the first audio signal (far spectrum) and the amplitude $A_{k,near}$ of the frequency $f_k$ in the derived frequency spectrum of the second audio signal (near spectrum) are greater than zero. Then the amplitude ratio $F_k$ is calculated as $F_k=A_{k,near}/A_{k,far}$ if this is the case and otherwise set to zero.

Figure 10:
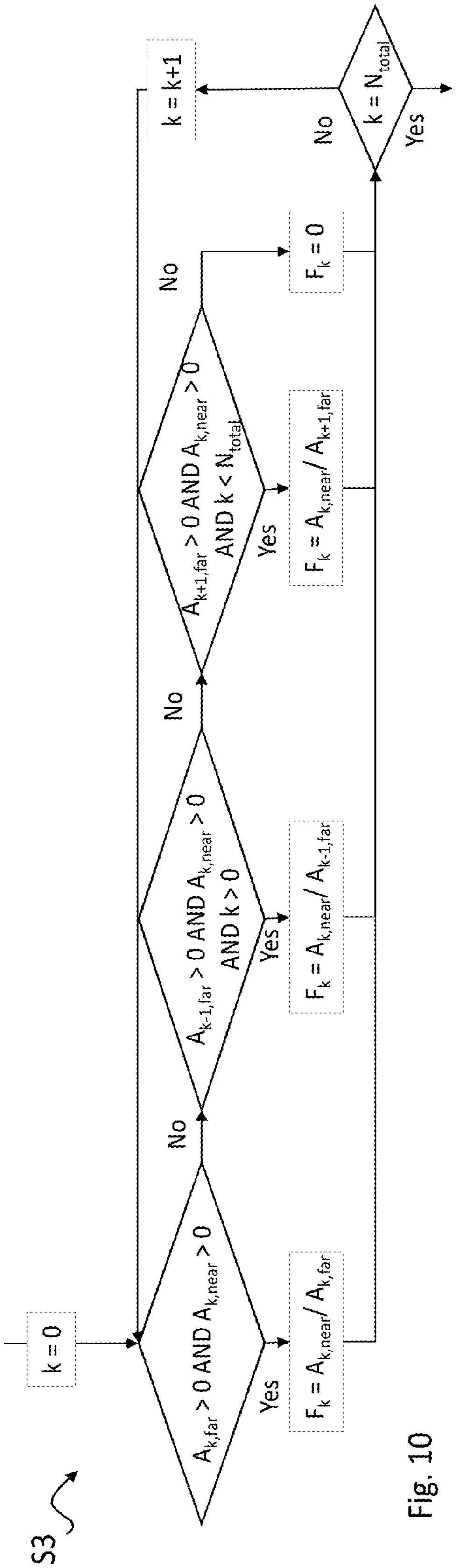

A possible offset error can be taken into account in the calculation of the amplitude ratios $F_k$, characterised by the corresponding frequencies in the spectra 30, 40 of the first and second audio signals not having the same index value k. Consequently the corresponding frequencies in the derived frequency spectra are not in the same location k either. FIG. 10 shows the process flow for an offset correction implemented in step S3, which can be carried out alternatively to step S3 in FIG. 9.

The offset correction builds on and expands the last mentioned condition. For the frequency $f_k$, the ratio $F_k$ of the amplitude value $A_{k,near}$ of the frequency $f_k$ in the derived frequency spectrum of the second audio signal to the amplitude value $A_{k,far}$ of the same frequency $f_k$ or the frequency with the same index k in the derived frequency spectrum of the first audio signal is only calculated if both aforementioned amplitude values $A_{k,near}$, $A_{k,far}$ are greater than zero (first condition). $F_k=A_{k,near}/A_{k,far}$ then applies as above, with this case applying to an exact spectral match.

If this first condition is not met, i.e. the amplitude value $A_{k,far}$ of the far spectrum is zero, the two immediately adjacent frequencies $f_{k-1}$ and $f_{k+1}$ of the frequency $f_k$ in the derived frequency spectrum of the first audio recording, i.e. in the far spectrum, are checked sequentially.

Thus the ratio $F_k$ of the amplitude value $A_{k,near}$ of the frequency $f_k$ in the derived frequency spectrum of the second audio recording to the amplitude value $A_{k-1,far}$ of the frequency $f_{k-1}$ preceding $f_k$ in the derived frequency spectrum of the first audio recording is calculated for the frequency $f_k$ if these two aforementioned amplitude values $A_{k,near}$, $A_{k-1,far}$ are greater than zero (second condition). In this case there is an upward spectral offset Δf of the far spectrum, and $F_k=A_{k,near}/A_{k-1,far}$ then applies. However, this calculation is only performed for k>0, so that $A_{k-1,far}$ can be calculated.

If this second condition is not met, a check is performed whether the amplitude value $A_{k,near}$ of the frequency $f_k$ in the derived frequency spectrum of the second audio recording and the amplitude value $A_{k+1,far}$ of the frequency $f_{k+1}$ following $f_k$ in the derived frequency spectrum of the first audio recording are both greater than zero (third condition). In this case the ratio is calculated for the frequency $f_k$ as $F_k=A_{k,near}/A_{k+1,far}$. However, this calculation is only performed for $k<N_{total}$, so that $A_{k+1,far}$ can be calculated.

If this third condition is not met either, the ratio $F_k$ is set to zero for the frequency $f_k$, because either the amplitude value $A_{k,near}$ of the frequency $f_k$ in the derived frequency spectrum of the second audio signal is equal to zero in this case, or the amplitudes of all three frequencies $f_k$, $f_{k+1}$ in the derived frequency spectrum of the second audio signal are equal to zero.

Overall the offset correction, omitting the limit frequencies $f_k$ for k=0 and $k=N_{total}$ is mathematically represented as follows, where the following initially applies for the amplitude values $A_k$ for the discrete frequencies $f_k$:

$$A_k^{fern} = A_k^{fern}(f_k) \text{ with } f_k = f_{min} + k \cdot \Delta f \text{ and } k = 0, \ldots , N_{total}$$

$$A_k^{nah} = A_k^{nah}(f_k) \text{ with } f_k = f_{min} + k \cdot \Delta f \text{ and } k = 0, \ldots , N_{total}$$

where Δf is the resolution of the frequency axis.

a) Exact spectral match:

$$(A_k^{fern} > 0) \wedge (A_k^{nah} > 0) \Rightarrow F_k = A_k^{nah}/A_k^{fern}$$

b) Minor upward spectral offset Lf of the far spectrum $$(A_{k-1}^{fern} > 0) \wedge (A_k^{nah} > 0) \wedge (k > 0) \Rightarrow F_k = A_k^{nah}/A_{k-1}^{fern}$$

c) Minor downward spectral offset Lf of the far spectrum $$(A_{k+1}^{fern} > 0) \wedge (A_k^{nah} > 0) \wedge (k < N_{I,total}) \Rightarrow F_k = A_k^{nah}/A_{k+1}^{fern}$$

If none of the three cases mentioned above occurs, the amplitude ratio $F_k$ is set to zero.

The simultaneous occurrence of more than one of the aforementioned cases a), b) and c) is unlikely due to the selection of the dominant frequencies performed in the frequency spectra of the first and second audio signals. However, rules can also be defined to select the preferred case when more than one case occurs simultaneously. Once such rule is used in FIG. 11 as an example, showing the sub-steps of an alternative implementation of step S3 in a flow chart.

In contrast to the implementation of step S3 according to FIG. 10, the three aforementioned conditions are not checked alternatively here, as they are in FIG. 10, but cumulatively by checking the next condition both when a condition returns "yes" and when it returns "no". Here the sequence does not matter in principle.

Figure 11:
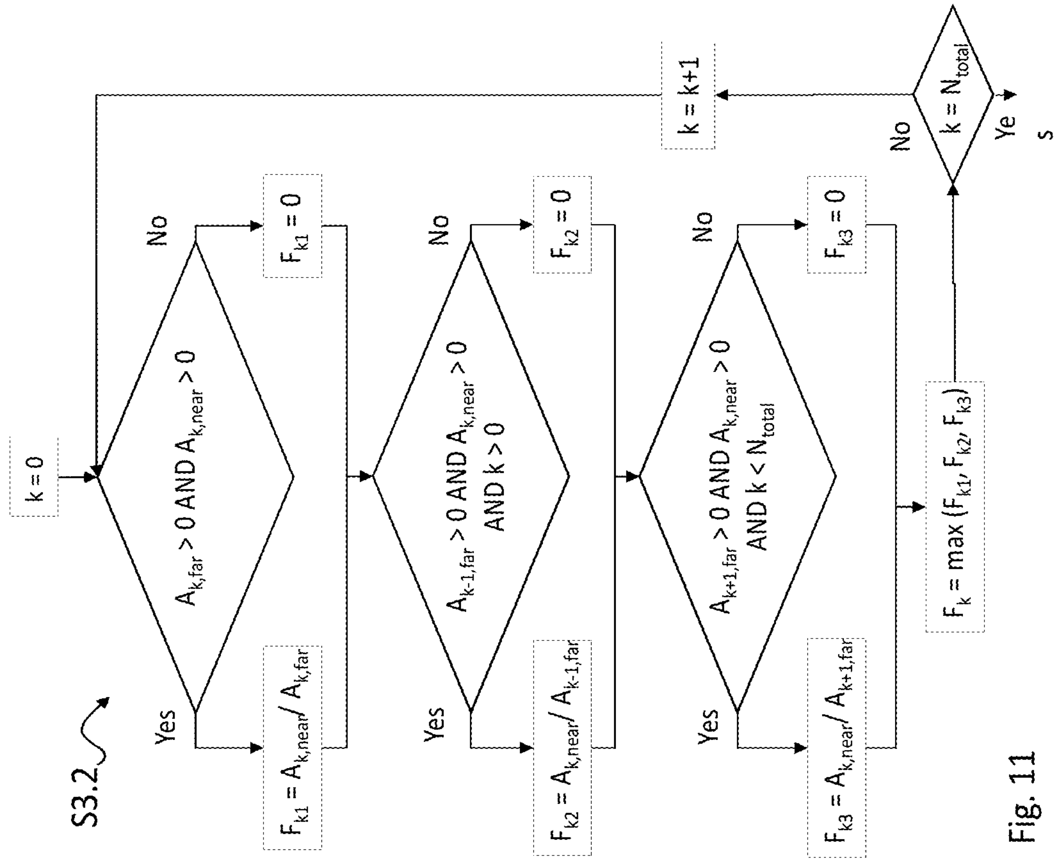

In order to check whether two or even all three cases a), b) and c) have occurred simultaneously, a separate ratio $F_{k1}$, $F_{k2}$, $F_{k3}$ is calculated for each case a), b) and c), rather than just a single amplitude ratio $F_k$. Which cases have occurred cumulatively can be determined by checking which of these ratios $F_{k1}$, $F_{k2}$, $F_{k3}$ are greater than zero. A priority rule can then be applied, determining which ratio $F_{k1}$, $F_{k2}$, $F_{k3}$ is used as the ratio $F_k$ in this case. In FIG. 11 the priority rule is defined so that the largest of the ratios $F_{k1}$, $F_{k2}$, $F_{k3}$ is used as the ratio $F_k$.

While the embodiments in FIGS. 10 and 11 only account for a spectral offset of one frequency resolution 1·f, i.e. a frequency offset by a single index value+1-1, alternatives that are not illustrated can also examine a spectral offset by $2 \cdot \Delta f$, i.e. two index values+1-2, and where applicable by $3 \cdot \Delta f$, i.e. three index values+1-3, adding additional cases. The higher the chosen resolution 4, the higher the probability that a certain peak in the far spectrum is offset by one, two or even three indices k.

Figure 12:
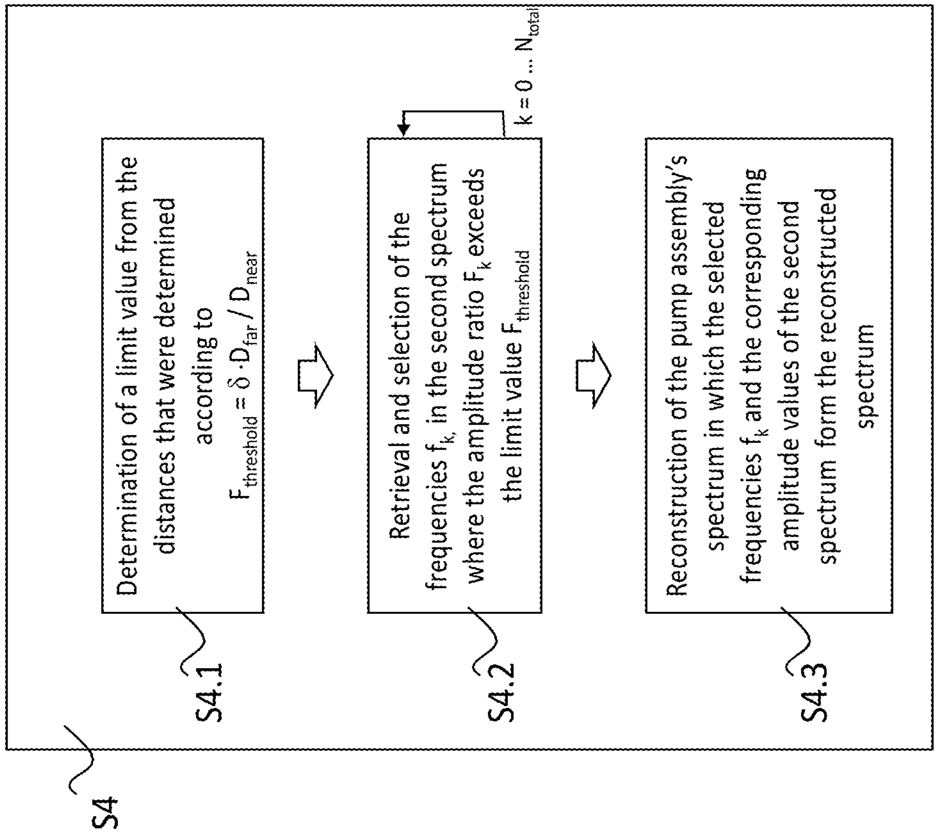

After the ratios $F_k$ of the amplitudes of all corresponding frequencies $f_k$ in the first and second audio signals are determined in step S3, the reconstruction of the spectrum 50, free of ambient noise, of the primary sound source $S_{primary}$, i.e. the pump assembly 1, follows in step S4. This is done by comparing the amplitude ratios $F_k$ with a limit value $F_{threshold}$, which is calculated under consideration of a distance law from the distances $D_{near}$, $D_{far}$ determined in steps S1.2 and S1.4. FIG. 12 shows the sub-steps of the reconstruction method in step S4.

Here the limit value $F_{threshold}$ is initially determined in step S4.1 from the distances determined according to the calculation rule $$F_{threshold} = \delta \cdot D_{far} / D_{near}.$$

Thus the limit value $F_{threshold}$ is determined from the ratio of the distances $D_{far}$, $D_{near}$ between the respective measuring position far, $P_{far}$, $P_{near}$ and the primary sound source $S_{primary}$, or more precisely from the ratio of the first distance $D_{far}$ of the far measurement to the second distance $D_{near}$ of the near measurement.

The calculation rule reflects the distance rule $p \sim 1/r$, whereby the change in the amplitudes is inversely proportional to the distance r of the sensor 12 from the sound source for sound pressure level values p, as recorded by the acoustic sensor 12. This circumstance is now used specifically to separate the primary sound source $S_{primary}$ from the other sound source $S_{secondary}$.

Here the ratio $D_{far}$ to $D_{near}$ is also weighted with a factor δ, which lies between 0.8 and 1, in order to obtain a certain tolerance in evaluating whether the distance law is met for a certain frequency.

The frequencies $f_k$, for which the amplitude ratios $F_k$ exceed the limit value $F_{threshold}$ are then identified and selected in step S4.2. Whether the amplitude ratio $F_k$ determined for the frequency $f_k$ and thus assigned to it exceeds the limit value $F_{threshold}$ is checked for each frequency $f_k$ (with k=0 to $N_{total}$). If this is the case, this frequency $f_k$ is part of the frequency spectrum of the primary sound source $S_{primary}$ and is selected for the next step S4.3. On the other hand, if the frequency ratio $F_k$ is below the limit value $F_{threshold}$, this frequency $f_k$ is part of the frequency spectrum of a secondary sound source $S_{secondary}$ and is ignored.

Finally, the spectrum of the primary sound source $S_{primary}$ is extracted from the combined spectrum of the second audio signal in step S4.3. In other words, a reconstruction of the spectrum 50 of the pump assembly 1 is carried out by selecting the identified frequencies $f_k$ and, along with their corresponding amplitude values of the spectrum 40 of the second audio signal, forming the reconstructed spectrum 50. Alternatively the spectrum 30 of the first audio signal could be used here as well. However, the spectrum 40 of the second audio signal has the advantage that its amplitudes are larger.

The reconstruction can be realised conveniently by "copying" the selected frequencies from the combined spectrum 40 for the near measuring position $P_{near}$ and "writing" them to an empty spectrum, creating the reconstructed spectrum 50. Alternatively, the reverse approach can be used by setting the amplitudes of the frequencies $f_k$ in the frequency spectrum 40 to zero where the assigned amplitude ratio $F_k$ is below the limit value $F_{threshold}$. The reconstructed spectrum 50 corresponds to an approximation of the actual spectrum of the primary sound source $S_{primary}$.

Figure 13:
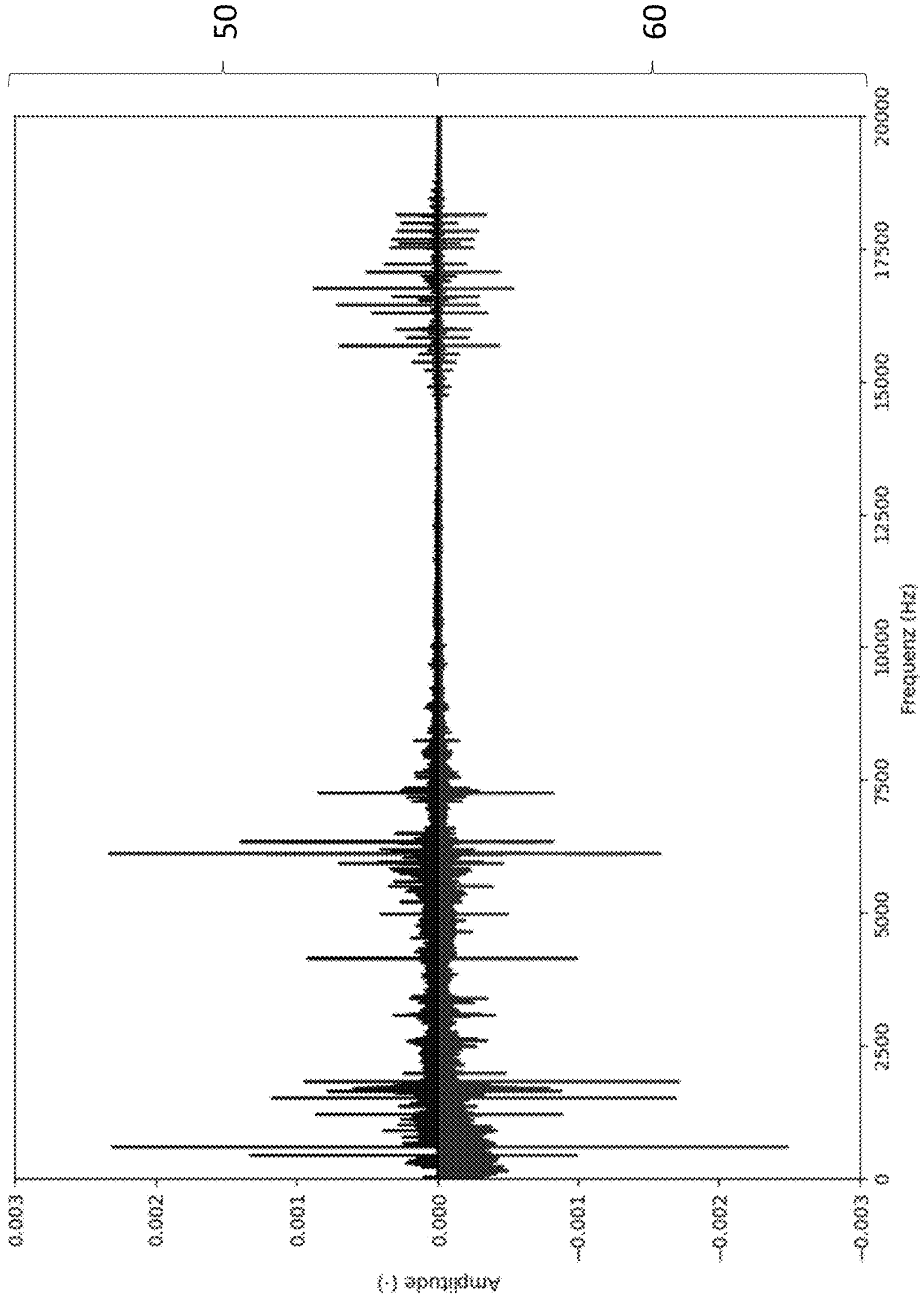

FIG. 13 shows a comparison of the reconstructed spectrum 50 of the primary sound source $S_{primary}$ with the original spectrum 60 of the primary sound source $S_{primary}$ or the pump assembly 1 in a joint frequency diagram, in which the amplitude values of the original spectrum 60 have a negative leading sign for this purpose, so that the original spectrum 60 appears in the lower half of the diagram and the reconstructed spectrum 50 appears in the upper half of the diagram.

Note that the preceding description is merely exemplary for the purpose of illustration and in no way limits the scope of protection of the invention. Characteristics of the invention designated as "can", "exemplary", "preferred", "optional", "ideal", "advantageous", "where applicable", "appropriate" or the like are merely elective and in no way limit the scope of protection, which is established exclusively by the claims. Insofar as elements, components, process steps, values or information are cited in the preceding description that have known, obvious or foreseeable equivalents, these equivalents are also covered by the invention. Furthermore, the invention encompasses all changes, variations or modifications of embodiments of the invention that involve the exchange, addition, change or omission of elements, components, process steps, values or information, as long as the fundamental concept according to the present invention is preserved, regardless of whether the changes, variations or modifications result in an improvement or an impairment of an embodiment.

Although the preceding description of the present invention identifies numerous material/immaterial characteristics or characteristics pertaining to the subject matter of the proceedings in reference to one or more concrete embodiment(s) of the invention, these characteristics can also be used in isolation from the concrete embodiment of the invention, at least insofar as they do not require the mandatory presence of additional characteristics. Conversely, these characteristics mentioned in reference to one or more concrete embodiment(s) of the invention can be combined at will with each other and with additional disclosed or undisclosed characteristics or embodiments of the invention that are not shown, at least to the extent that these characteristics do not mutually exclude each other or result in technical incompatibilities.

The invention claimed is:

1. A method for analysing a state of at least one component of a pump assembly to determine a rotational speed of the pump assembly or an error through analysis of an airborne sound emitted by the pump assembly, comprising recording with a microphone at least a first audio signal during operation of the pump assembly at a first geometric location ($P_{far}$) and at a first distance ($D_{far}$) from the pump assembly, and recording with a microphone a second audio signal during operation of the pump assembly a second geometric location ($P_{near}$) and at a second distance ($D_{near}$) from the pump assembly which second distance is less than the first distance ($D_{far}$), and determining the state of at least one component of the pump assembly through analysis of a signal of the pump assembly corrected for ambient noise of at least one secondary sound source and reconstructed through a comparison of amplitude values of the first and second audio signals, wherein respectively one spectrum of the first and second audio signals is determined and a ratio of amplitude values of corresponding spectral components ($f_k$, $f_{k-1}$, $f_{k+1}$) of the two spectra or spectra derived from them is formed, and the reconstructed signal is formed from the amplitude values of those spectral components ($f_k$) of one of the two spectra or spectra derived from them for which the ratio ($F_k$) lies beyond a predetermined limit value ($F_{threshold}$), in order to eliminate the ambient noise in the first and/or second audio signal.

2. The method according to claim 1, wherein the two spectra are frequency spectra and the spectral components are frequencies.

3. The method according to claim 2, wherein the reconstructed signal is formed from the amplitude values of the spectral components ($f_k$) of the spectrum of the second audio signal or a spectrum derived from the same.

4. The method according to claim 3, wherein a number of dominant spectral components ($f_k$) are first determined from each of the two spectra the dominant spectral components ($f_k$) with their amplitude values form the respective derived spectrum, and the ratio of the amplitude values of the dominant spectral components ($f_k$).

5. The method according to claim 4, wherein the two spectra are divided into intervals and a number of dominant spectral components ($f_k$) is determined and selected for each interval.

6. The method according to claim 5, wherein the dominant spectral components are determined through application of a sorting algorithm configured to execute the following steps:

a. Initially check all spectral components ($f_k$) sequentially to determine which spectral component ($f_k$) has the highest amplitude, b. subsequently, check the remaining spectral components ($f_k$) sequentially to determine which of the remaining spectral components ($f_k$) has the highest amplitude, and c. repeat step b) $N_{peak}-2$ times, where $N_{peak}$ is the number of dominant spectral components ($f_k$).

7. The method according to claim 1, wherein the amplitude ratios are formed in such a manner that, for one spectral component ($f_k$), the ratio ($F_k$) of the amplitude value of the spectral component ($f_k$) in the spectrum of the second audio signal or in the spectrum derived from that to the amplitude value of the corresponding spectral component ($f_k$, $f_{k-1}$, $f_{k+1}$) in the spectrum of the first audio signal or in the spectrum derived from that is calculated.

8. The method according to claim 7, wherein the ratio ($F_k$) of the amplitude value of the spectral component ($f_k$) in the spectrum of the second audio signal or in the spectrum derived from that to the amplitude value of the same spectral component ($f_k$) in the spectrum of the first audio signal or in the spectrum derived from that being calculated for a spectral component ($f_k$) only when both aforementioned amplitude values are greater than zero.

9. The method according to claim 8, wherein an offset correction is performed in forming the amplitude ratios, by a. for the spectral component ($f_k$), calculating the ratio ($F_k$) of the amplitude value of the spectral component ($f_k$) in the spectrum of the second audio signal or in the spectrum derived from that to the amplitude value of the same spectral component ($f_k$) in the spectrum of the first audio signal or in the spectrum derived from that when both aforementioned amplitude values are greater than zero, and/or b. for the spectral component ($f_k$), calculating the ratio ($F_k$) of the amplitude value of the spectral component ($f_k$) in the spectrum of the second audio signal or in the spectrum derived from that to the amplitude value of the previous spectral component ($f_{k-1}$) in the spectrum of the first audio signal or in the spectrum derived from that when both aforementioned amplitude values are greater than zero, and/or c. for the spectral component ($f_k$), calculating the ratio ($F_k$) of the amplitude value of the spectral component ($f_k$) in the spectrum of the second audio signal or in the spectrum derived from that to the amplitude value of the next spectral component ($f_{k+1}$) in the spectrum of the first audio signal or in the spectrum derived from that when both aforementioned amplitude values are greater than zero.

10. The method according to claim 9, further comprising sequentially checking, for all spectral components ($f_k$), for which spectral component ($f_k$) a determined amplitude ratio exceeds the limit value ($F_{threshold}$) and by those spectral components ($f_k$) where this is the case, along with the amplitude values assigned to these spectral components ($f_k$) from the spectrum of the second audio signal, forming the reconstructed signal.

11. The method according to claim 1, wherein the first geometric location ($P_{far}$), the second geometric location ($P_{near}$) and the pump assembly lie on a straight measuring line or the first geometric location ($P_{far}$) and the second geometric location ($P_{near}$) lie on a circular path around one of the at least one secondary sound source.

12. The method according to claim 1, wherein the first and second audio signal respectively forming a sound pressure level/time gradient of the sensor.

13. The method according to claim 1, wherein the second distance ($D_{near}$) is half the first distance ($D_{far}$).

14. The method according to claim 1, wherein the distances ($D_{far}$, $D_{near}$) respectively are determined by an optical measurement, in which the pump assembly is recorded using a camera, respectively from the first and second geometric locations ($P_{far}$, $P_{near}$).

15. The method according to claim 14, wherein the pump assembly is recorded visually in at least one image using the camera and each of the at least one image is analysed.

16. A software application configured for a mobile analysis device having a display, at least one control element and an acoustic sensor and optionally an optical sensor, comprising a non-transitory computer readable medium having program instructions recorded thereon that are configured so that when they are executed by the analysis device, cause the analysis device to execute the method according to claim 1.

17. A non-transitory computer readable medium having program instructions recorded thereon that are configured so that when they are executed by an analysis device having a display, at least one control element and an acoustic sensor and optionally an optical sensor, cause the analysis device to execute the method according to claim 1.

18. The method according to claim 1, wherein the limit value ($F_{threshold}$) is calculated under consideration of a ratio of the two distances ($D_{far}$, $D_{near}$) to each other.

19. A mobile analysis device having a display, at least one control element and an acoustic sensor to record audio and optionally an optical sensor, wherein the analysis device is configured to execute the method according to claim 1.

* * * * *